(12) United States Patent
Yamamoto

(10) Patent No.: US 7,167,909 B2
(45) Date of Patent: Jan. 23, 2007

(54) SERVICE MANAGEMENT APPARATUS FOR MANAGING SERVICE INFORMATION FOR SERVICES PRESENT IN NETWORK SYSTEM AND APPARATUS FOR INSTRUCTING SERVICE MANAGEMENT APPARATUS

(75) Inventor: Masahito Yamamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 620 days.

(21) Appl. No.: 09/823,990

(22) Filed: Apr. 3, 2001

(65) Prior Publication Data

US 2001/0037476 A1 Nov. 1, 2001

(30) Foreign Application Priority Data

Apr. 5, 2000 (JP) .............................. 2000-104041

(51) Int. Cl.
G06F 15/16 (2006.01)
G06F 15/173 (2006.01)

(52) U.S. Cl. ...................... 709/223; 709/203; 709/229; 370/230; 370/252

(58) Field of Classification Search ................ 709/223, 709/203, 224, 225, 229; 370/230, 252, 428
See application file for complete search history.

(56) References Cited

U.S. PATENT DOCUMENTS

| 5,581,544 | A | * | 12/1996 | Hamada et al. ............. 370/253 |
|---|---|---|---|---|
| 5,867,495 | A | * | 2/1999 | Elliott et al. ................ 370/352 |
| 6,028,838 | A | * | 2/2000 | Yamamura et al. ......... 370/229 |
| 6,094,674 | A | * | 7/2000 | Hattori et al. .............. 709/203 |
| 6,215,855 | B1 | * | 4/2001 | Schneider .................... 379/22 |
| 6,356,565 | B1 | * | 3/2002 | Bouyer et al. ............. 370/468 |
| 6,446,126 | B1 | * | 9/2002 | Huang et al. ............... 709/226 |
| 6,449,588 | B1 | * | 9/2002 | Bowman-Amuah ......... 703/21 |
| 6,563,796 | B1 | * | 5/2003 | Saito ........................ 370/252 |
| 6,571,285 | B1 | * | 5/2003 | Groath et al. ............... 709/223 |
| 6,621,805 | B1 | * | 9/2003 | Kondylis et al. ........... 370/329 |
| 6,721,290 | B1 | * | 4/2004 | Kondylis et al. ........... 370/329 |
| 6,912,568 | B1 | * | 6/2005 | Nishiki et al. ............. 709/223 |
| 6,976,195 | B1 | * | 12/2005 | Seyyedy et al. ............ 714/718 |

FOREIGN PATENT DOCUMENTS

| JP | 10-222465 | 8/1998 |
|---|---|---|
| JP | 11-096128 | 4/1999 |
| JP | 11-237975 | 8/1999 |
| JP | 11-353159 | 12/1999 |

* cited by examiner

*Primary Examiner*—Ario Etienne
*Assistant Examiner*—El Hadji M. Sall
(74) *Attorney, Agent, or Firm*—Fitzpatrick, Cella, Harper & Scinto

(57) ABSTRACT

In a network system capable of providing various services dispersed among plural apparatuses, the invention provides a service management apparatus capable of managing service information on the services present in the network system. The service management apparatus transfers the managed service information in response to a request from an external apparatus, and also renews the service information based on the current actual quality of the service.

24 Claims, 20 Drawing Sheets

FIG. 12

| DATE OF REGISTRATION | PERIPHERAL NAME | SERVICE | STAB DRIVER |
|---|---|---|---|
| 1998.12.19 | IMAGE I/O DAVICE 12-1 | PDL PRINT | 608-1 |
| 1998.12.19 | IMAGE I/O DAVICE 12-1 | PRINT | 610-1 |
| 1998.12.19 | IMAGE I/O DAVICE 12-1 | SCAN | 612-1 |
| 1998.12.19 | IMAGE I/O DAVICE 12-1 | FAX MODEM RECEPTION | 614-1 |
| 1998.12.19 | IMAGE I/O DAVICE 12-1 | FAX MODEM TRANSMISSION | 616-1 |
| 1998.12.23 | IMAGE I/O DAVICE 12-2 | PDL PRINT | 608-2 |
| 1998.12.23 | IMAGE I/O DAVICE 12-2 | PRINT | 610-2 |
| 1998.12.23 | IMAGE I/O DAVICE 12-2 | SCAN | 612-2 |
| 1998.12.23 | IMAGE I/O DAVICE 12-2 | FAX MODEM RECEPTION | 614-2 |
| 1998.12.23 | IMAGE I/O DAVICE 12-2 | FAX MODEM TRANSMISSION | 616-2 |

1801

SERVICE MANAGEMENT APPARATUS FOR MANAGING SERVICE INFORMATION FOR SERVICES PRESENT IN NETWORK SYSTEM AND APPARATUS FOR INSTRUCTING SERVICE MANAGEMENT APPARATUS

BACKGROUND OF THE INVENTION

1. Field of the Invention

The present invention relates to a network system for providing various services dispersed on plural apparatus, and more particularly to a directory server for accumulating and managing information on the various services present on such network system and providing the client with information on the registered services.

2. Related Background Art

Conventionally there is being actively developed a document processing system of dispersed type in which apparatuses of single function for example an input apparatus such as an image scanner, a digital camera or a facsimile receiver and an output apparatus such as a printer or a facsimile transmitter are mutually connected by a network, and which is capable of providing the client with complex functions, obtained by combining the functions of such single-functioned apparatus (for example data input function, data output function, and input and output of data stored in a secondary storage device (network attached storage)).

Also, in a so-called multi-function product (MFP), in which the functions of plural single-functioned apparatuses are united in a single casing, there is also being actively developed a document processing system of dispersed type capable of realizing various complex functions by selectively combining one or some of such single functions with those of other apparatuses through a network.

As a programming model for facilitating the function providing over the information processing apparatuses dispersed in the network, there is already well known a remote procedure call (RPC) or a dispersed object technology. Such dispersed object technology is an expansion of the object-oriented software model to a dispersed system, and enables, by a procedure equivalent to that of calling an operation of a network node from the same node, to call an operation of another network node.

Also, in document processing including document input and document output, dispersed object technology is expected to achieve flexible linking of plural functions. Systems based on the dispersed object technology and aiming also at applications other than the dispersed information processing such as pure calculations are being proposed, for example, in Jini, which is an application of Java by the Sun (Stanford University Network) and in CORBA (Common Object Request Broker Architecture & Specifications) by the OMG (Object Management Group).

If the various apparatuses for document processing connected to the network can be controlled by the dispersed object technology, it will become easily possible to describe a flexible client application interchangeably combining various apparatus providing objects based on a predetermined interface. It will also become possible to describe a client application capable of dynamically inquiring the interface for operating an object, or dynamically downloading a stab object (or a proxy object), for concealing the communication with a server object in a remote location for providing the actual service, thereby accommodating a change in the control interface resulting for example from the addition of the apparatuses.

In a system in which the client is dynamically bound with the dispersed services at the execution (dynamic binding), thereby utilizing the services of the dispersed objects, there is utilized a directory server (name server, registry server, lookup server, etc.) storing the information of the available services, for enabling the client to locate the desired service. In a system in which plural services or clients are dispersed, a part of the services may become temporarily unavailable because of a failure of the apparatus providing the service or a breakage of the network connecting with the service. It is therefore necessary to execute appropriate maintenance on the information of the services registered in such directory server, thereby not introducing the unavailable service to the client.

In a case where each service is shut down and deactivated in proper manner, the cancellation of registration may be instructed in advance to the directory server from such service. However, such renewal of the information of the directory server from the registered service is not possible in the case of a system crash or in a case where reachability through the network is lost. Also, certain apparatuses such as the document processing apparatus must be prepared for a situation where the power supply is suddenly cut off by the user, and, also in such a case, the directory information based on the notice from the apparatus or the service cannot be properly maintained.

Also, a dispersed object system such as the Jini based on Java adopts a lease model, in which the client obtains the right of using various services during a predetermined term. For example, in a service of registering the service information of the client in the lookup server, the utilization of such lookup server is also leased for a certain term, and the registration is canceled unless the continuation of use is applied for before the expiration of the lease term. In order to accommodate such situation, the Jini system realizes the maintenance of the registered information in preparation for the unnotified cancellation of the services.

SUMMARY OF THE INVENTION

However, the above-described conventional technologies have been associated with the following drawbacks since the maintenance and renewal of the information registered in the directory server is based on the periodical lease renewal process executed by the service which registers the information.

More specifically, as to each service registered in the directory server, the client can know that such service is functioning at such a level allowing recent lease renewal, but cannot know whether the function to be achieved by such service is proper in quality.

Particularly in a case where plural services of similar kinds are registered for arbitrary selection, the client naturally wishes to judge which service is best in performance or in reliability, but the conventional directory server has not provided the information for such judgment.

Also, in the services provided for example by a document processing apparatus, the practical quality of the provided service may be affected by a dynamic state change in the apparatus, but the conventional directory server has not provided the client with a standard for selecting the optimum service among the plural services having such characteristics. Such changes in quality due to a dynamic state change can be exemplified, for example, by a color printer which is functioning as a monochromatic printer because of the exhaustion of the color toners or color inks, or by a printer designed to be capable of printing on an A3-sized sheet and provided with a cassette for holding the A3-sized sheets but lacking A3-sized sheets therein.

Also, in the conventional dispersed object system, the lease term is often made relatively long, because the overhead cost for the renewal process of the lease term becomes relatively large if the lease term is short, and consequently the maintenance of the registered information relying solely on the lease renewal is often unable to follow the dynamic state of the system.

Also, in a conventional system of a redundant configuration in which a plurality of equivalent services are provided in order to improve usability, the client has to judge the service to be used in place of a failed service and is therefore required to engage in a complex procedure.

In consideration of the foregoing, a first object of the present invention is to provide a directory server capable of providing the client not only with information of which it is notified by each respective service but also information indicating the level of quality of the service objectively evaluated by the actual trial use of the service.

The present invention also allows one to eliminate the registration of the service not only in the case of expiration of the lease term but also in a case where the service is canceled without notification.

The present invention, in a system including a plurality of equivalent services, further allows the client automatically to select a proxy service replacing a failed service, thereby enabling the client to enjoy improved usability by the redundant configuration without complicating the process of the client.

The present invention further realizes simple dispersion of loads (load balancing) based on the redundant configuration, thereby realizing a redundant configuration capable of responding to a practical loss in the quality of the provided service, for example by switching to a proxy service in response to a dynamic state change of the apparatus such as exhaustion of toner or paper.

One aspect of the present invention is a service management apparatus used in a network system, comprising a storage means, a registration means, a test means, an evaluation means and a renewal means. The storage means stores service information of services executed in the network system. The registration means registers, in the storage means, service information of a certain service provided by a service apparatus by an application program, in response to a request from an external apparatus that is to execute the service. The test means executes a trial use of the service provided by the service apparatus. In the trial use, the test means sends data to the service by using an operation of the service provided by the application program, and the test means repeatedly executes the trial use. The evaluation means evaluates the quality of the service in response to execution of the trial use, and detects change in quality of the service between a current trial use and a previous trial use. The renewal means deletes the registered service information from the storage means if the detected change shows that the quality of the service does not meet a predetermined reference.

Another aspect of the invention is an apparatus connected to such a service management apparatus, comprising a storage means, a registration means, a test means, an evaluation means and a deletion means. The storage means stores service information of services executed in the network system. The registration means registers, in the storage means, service information of a certain service provided by an application program in a service apparatus, in response to a request from an external apparatus that is to execute the service. The test means executes a trial use of a service provided by the application program in another apparatus belonging to a same group as that of the apparatus. In the trial use, the service of the other apparatus is executed, and the test means repeatedly executes the trial use. The evaluation means evaluates the quality of the service in response to execution of the trial use, and detects change in quality of the service between a current trial use and a previous trial use. The deletion means instructs the service management apparatus to delete the service information if the detected change shows that the quality of the service does not meet a predetermined reference.

Still another aspect is an apparatus connected to such a service management apparatus, comprising a test means, an evaluation means and a substitution means. The test means executes a trial use of a service provided by the application program in another apparatus belonging to a same group as that of the apparatus. In the trial use, an operation of the service of the other apparatus is executed, and the test means repeatedly executes the trial use. The evaluation means evaluates the quality of the service in response to execution of the trial use, and detects change in quality of the service between a current trial use and a previous trial use. The substitution means instructs the service management apparatus to substitute service information of the service provided by the another apparatus with service information provided by the apparatus if the detected change shows that the quality of the service does not meet a predetermined reference.

The method of performing the steps performed by such apparatuses, and software for doing so, are also aspects of the invention.

BRIEF DESCRIPTION OF THE DRAWINGS

FIG. 12 is a memory map showing the configuration of a management table in the lookup server in the embodiments of the present invention;

DESCRIPTION OF THE PREFERRED EMBODIMENTS

Now the present invention will be clarified in detail by description of the preferred embodiments, with reference to the accompanying drawings.

Common Configuration and Function

Prior to the description of the preferred embodiments of the present invention, there will be explained the configuration of the system and apparatus used in common in the embodiments of the present invention and the function of the apparatus.

Figure 1:
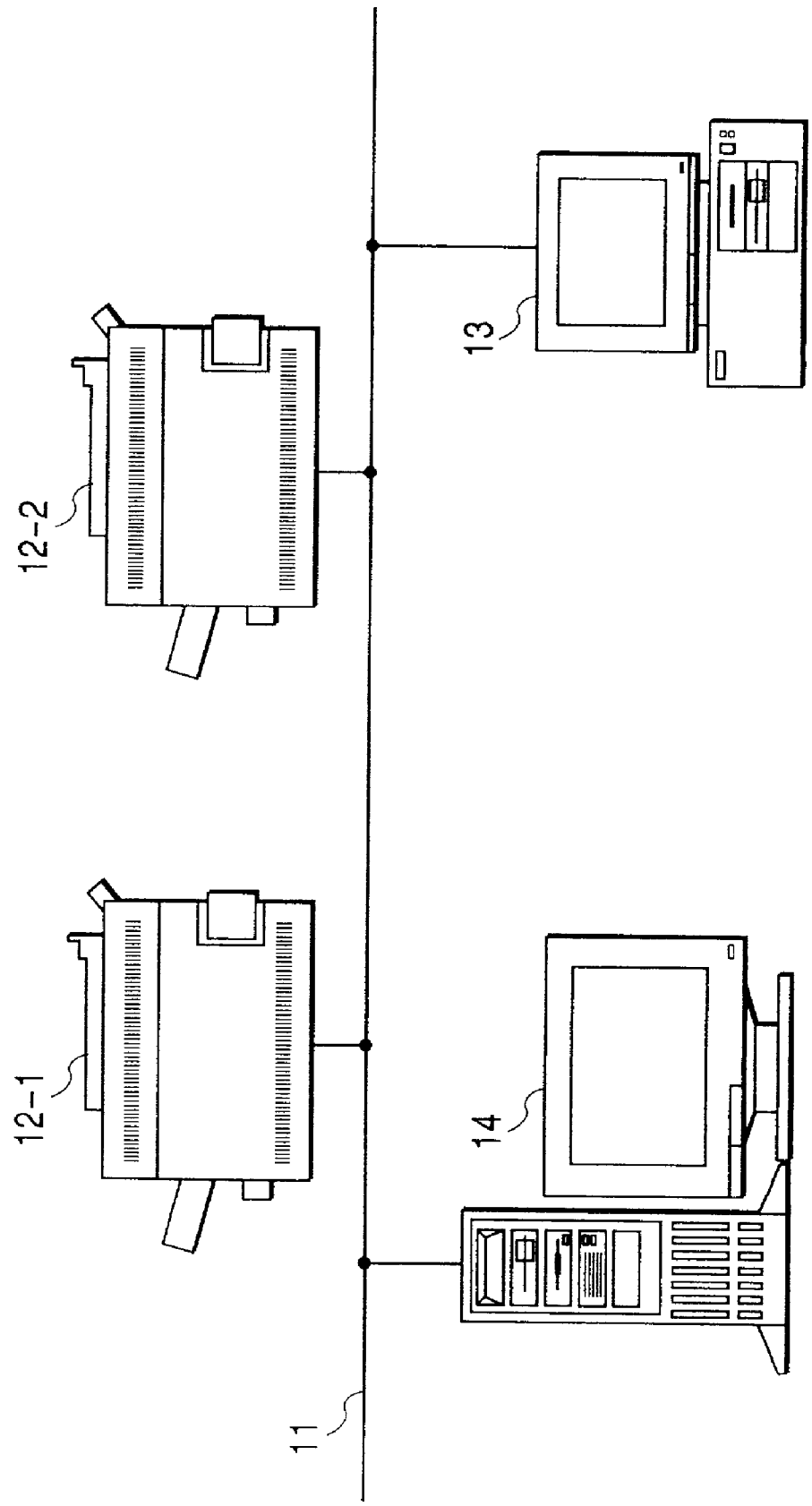
FIG. 1 is a schematic view showing the network configuration in embodiments of the present invention.

FIG. 1 shows a network system in embodiments of the present invention. As shown in FIG. 1, a network 11 is connected to two image input/output apparatuses 12-1, 12-2 adapted to a dispersed object environment such as Jini of Java or CORBA, a client computer 13 and a lookup server computer 14.

The dispersed object environment-adapted image input/output apparatuses 12-1, 12-2 can transfer respective data through the network 11. Also, the client computer 13 can remotely control the dispersed object environment-adapted image input/output apparatuses 12-1, 12-2. In the lookup server 14, there is registered a service proxy object, together with attribute information thereof, required for the remote control of the dispersed object environment-adapted image input/output apparatuses 12-1, 12-2 (hereinafter collectively represented as "12") from the client computer 13.

Figure 2:
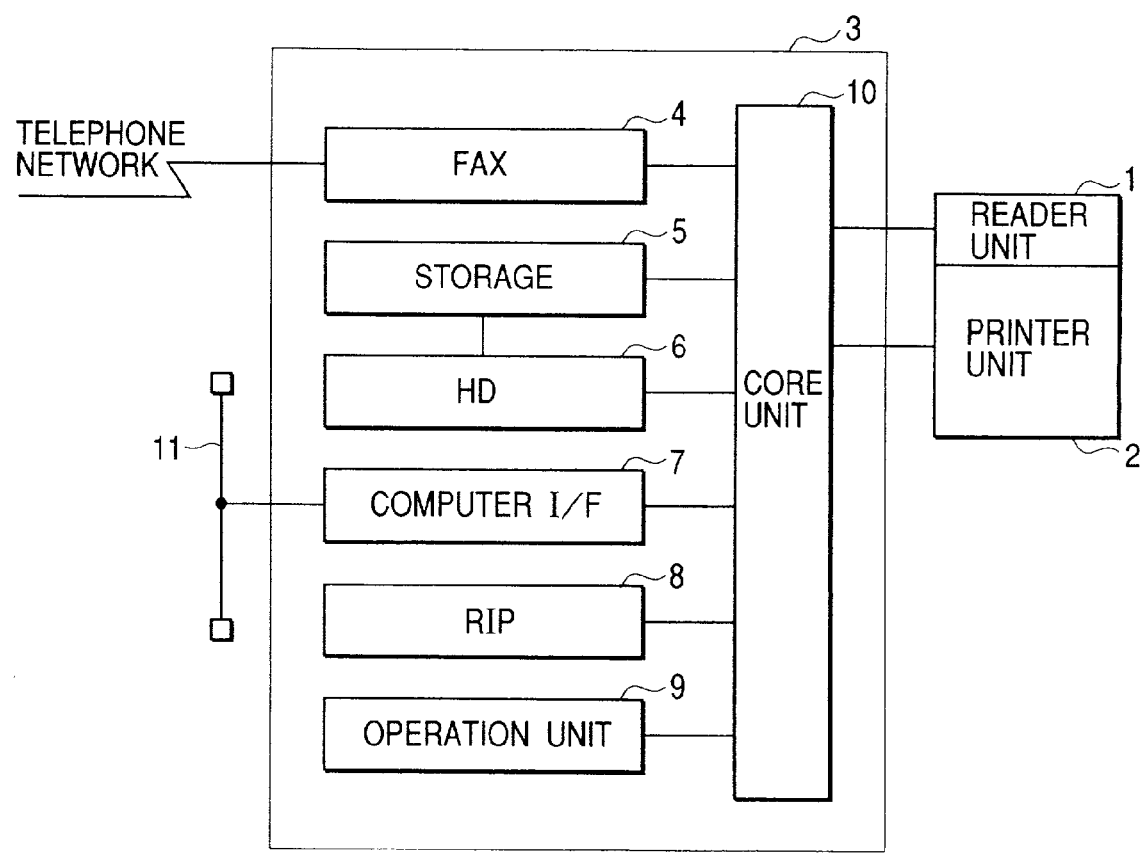
FIG. 2 is a block diagram showing the configuration of an image input/output apparatus adapted to the dispersed object environment in embodiments of the present invention.

FIG. 2 shows an example of the configuration of the dispersed object environment-adapted image input/output apparatus 12 shown in FIG. 1. As shown in FIG. 2, the dispersed object environment-adapted image input/output apparatus 12 is provided with a reader unit 1, a printer unit 2 and an image input/output control unit 3. The reader unit 1 reads the image of an original and outputs image data corresponding to the original image to the image input/output control unit 3. The printer unit 2 records, on a recording sheet, an image corresponding to the image data from the image input/output control unit 3. The image input/output control unit 3 is connected to the reader unit 1 and the printer unit 2, and is composed of a facsimile unit 4, a storage unit 5, a computer interface unit 7, a RIP (raster image processor) unit 8, an operation unit 9, a core unit 10, etc.

The facsimile unit 4 expands compressed image data received through a telephone line, transfers the expanded image data to the core unit 10, and also compresses image data transferred from the core unit 10 and transmits the compressed image data through a telephone line. The received or transmitted image data can be temporarily stored in a hard disk 6 connected to the storage unit 5.

The storage unit 5, connected with a hard disk 6, compresses the image data transferred from the core unit 10 and stores such image data in the hard disk 6 together with an ID (identification) number for searching the image data. Also, the storage unit 5 searches for the compressed image data stored in the hard disk 6 based on the code data transferred through the core unit 10, and reads and expands the compressed image data once it is found, and transfers the expanded image data to the core unit 10.

The computer interface unit 7 constitutes an interface between the network 11 and the core unit 10, and executes data exchange with the client computer 13 and other dispersed object environment-adapted image input/output apparatus(es) like apparatus 12.

The RIP unit 8 develops the code data (PDL: page description language) transferred from the network 11 and representing an image into image data that can be recorded in the printer unit 2.

The operation unit 9 is provided with a touch panel display and hard keys (not shown), and constitutes a user interface for instructing and setting operations to the dispersed object environment-adapted image input/output apparatus 12.

The core unit 10 controls, as will be explained later in more detail, the data flow among the reader unit 1, the printer unit 2, the facsimile unit 4, the storage unit 5, the computer interface unit 7, the RIP unit 8 and the operation unit 9.

Figure 3:
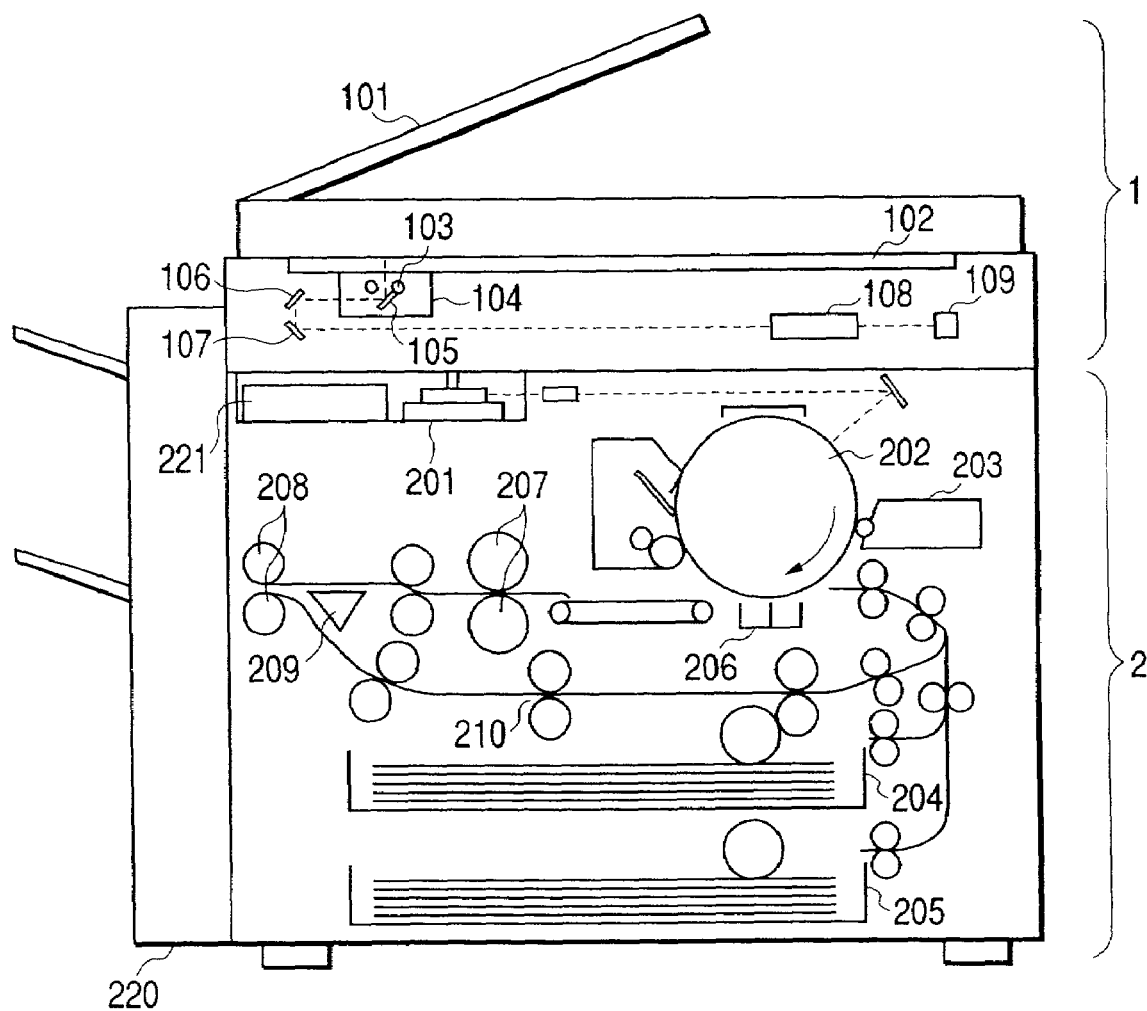
FIG. 3 is a cross-sectional view showing the configuration of a reader unit and a printer unit of the image input/output apparatus adapted to the dispersed object environment in the embodiments of the present invention.

FIG. 3 is a cross-sectional view showing the configuration of the reader unit 1 and the printer unit 2 shown in FIG. 2. An original document feeder 101 of the reader unit 1 feeds the originals one by one from the top onto a platen glass 102, and discharges the original therefrom after the original reading operation. When an original is conveyed onto the platen glass 102, a lamp 103 is turned on and the movement of a scanner unit 104 is started to execute scanning exposure of the original. The light reflected from the original is guided by mirrors 105, 106, 107 and a lens 108 to a CCD (charge coupled device) 109, whereby the image of the scanned original is read by the CCD 109. Image data outputted from the CCD 109 are transferred, after predetermined processing, to the core unit 3 of the image input/output control unit 3.

A laser driver 221 of the printer unit 2 drives and causes a laser emission unit 201 to emit laser light corresponding to the image data from the core unit 10 of the image input/output control unit 3. The laser light irradiates a photosensitive drum 202 to form thereon a latent image corresponding to the image information borne by the laser light. Developer is deposited by a developing unit 203 on the latent image on the photosensitive drum 202. A recording sheet is fed from a cassette 204 or 205 to a transfer unit 206 with a timing synchronized with the start of laser light irradiation and the developer deposited on the photosensitive drum 202 is transferred onto the recording sheet.

The recording sheet bearing the developer is conveyed to a fixing unit 207, in which the developer is fixed to the recording sheet by heat and pressure in the fixing unit 207. After passing the fixing unit 207, the recording sheet is discharged by discharge rollers 208 to a finisher 220, which sorts the recording sheets by collecting the discharged recording sheets in a bundle and staples thus sorted recording sheets.

When two-side recording is selected, the recording sheet is once discharged to the discharge rollers 208, and is then guided to a re-feeding path 210 by a flapper 209 and by reversing the rotating direction of the discharge rollers 208. The recording sheet guided to the re-feeding path 210 is fed again to the transfer unit 206 at the above-described timing.

Figure 4:
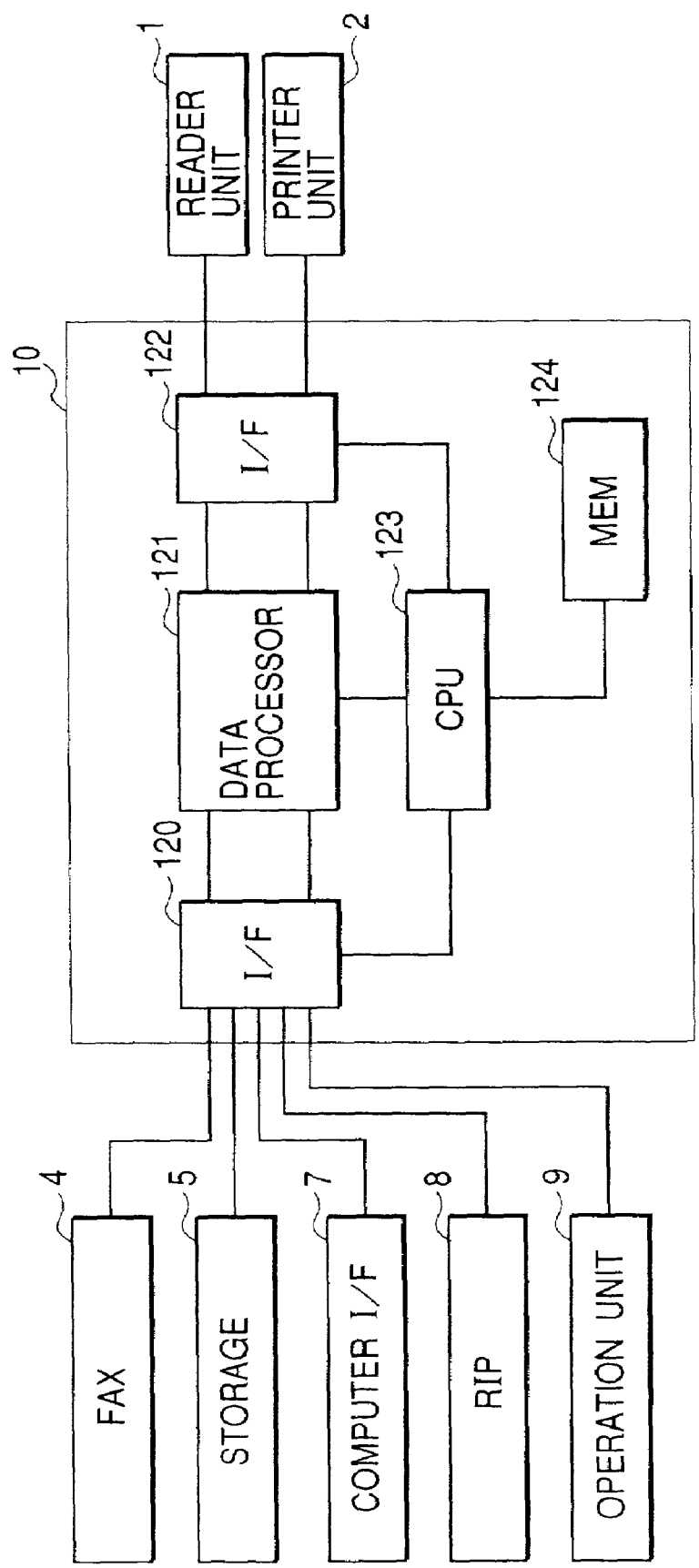
FIG. 4 is a block diagram showing the configuration of a core unit of the image input/output apparatus adapted to the dispersed object environment in the embodiments of the present invention.

FIG. 4 shows an example of the configuration of the core unit 10 shown in FIG. 2. As shown in FIG. 4, the core unit 10 is composed of an interface (I/F) unit 120, a data processing unit 121, an interface 122, a CPU (central processing unit) 130, a memory 124, etc. The image data from the reader unit 1 are transferred through the interface 122 to the data processing unit 121, which executes image processing such as image rotation and magnification change, and compression and expansion of the image data, and is provided therein with a page memory (not shown) corresponding to image data of plural pages of A4/letter size. The image data transferred from the reader unit 1 to the data processing unit 121 are temporarily stored in the page memory, then compressed and transferred to the storage unit 5 through the interface 120.

Also, the code data (PDL) representing an image entered through the computer interface unit 7 are transferred through the interface 120 to the data processing unit 120, then transferred to the RIP unit 8 for development into image data. The thus-developed image data are transferred to the data processing unit 121 for temporary storage in the aforementioned page memory (not shown), then compressed and transferred through the interface 120 to the storage unit 5.

The image data from the facsimile unit 4 are transferred to the data processing unit 121 for temporary storage in the aforementioned page memory (not shown), then are compressed and transferred through the interface 120 to the storage unit 5.

The image data from the storage unit 5 are transferred to the data processing unit 121, then are expanded and temporarily stored in the aforementioned page memory (not shown), and transferred through the interface unit 120 to the printer unit 2, the facsimile unit 4 and/or the computer interface unit 7.

The storage unit 5 executes input and output of the image and non-image data through the computer interface unit 7, thereby providing an external apparatus with data storing function.

The image data, after entry into the data processing unit 121 and temporary storage in the internal page memory (not shown) but prior to the transfer to the storage unit 5, may also be transferred to the printer unit 2, the facsimile unit 4 or the computer interface unit 7 by the switching of an internal selector (not shown).

The CPU 123 controls the above-mentioned functions according to a control program stored in a memory 124 and a control command transferred from the operation unit 9. The memory 124 is used also as a work area for the CPU 123.

Thus, the dispersed object environment-adapted image input/output apparatus 12 can execute a complex process involving functions of original image reading, image printing, image transmission and reception, image storage, data input into and output from computers (13, 14 in FIG. 1) principally by the core unit 10 and through the data processing unit 121 thereof and the storage unit 5.

Figure 5:
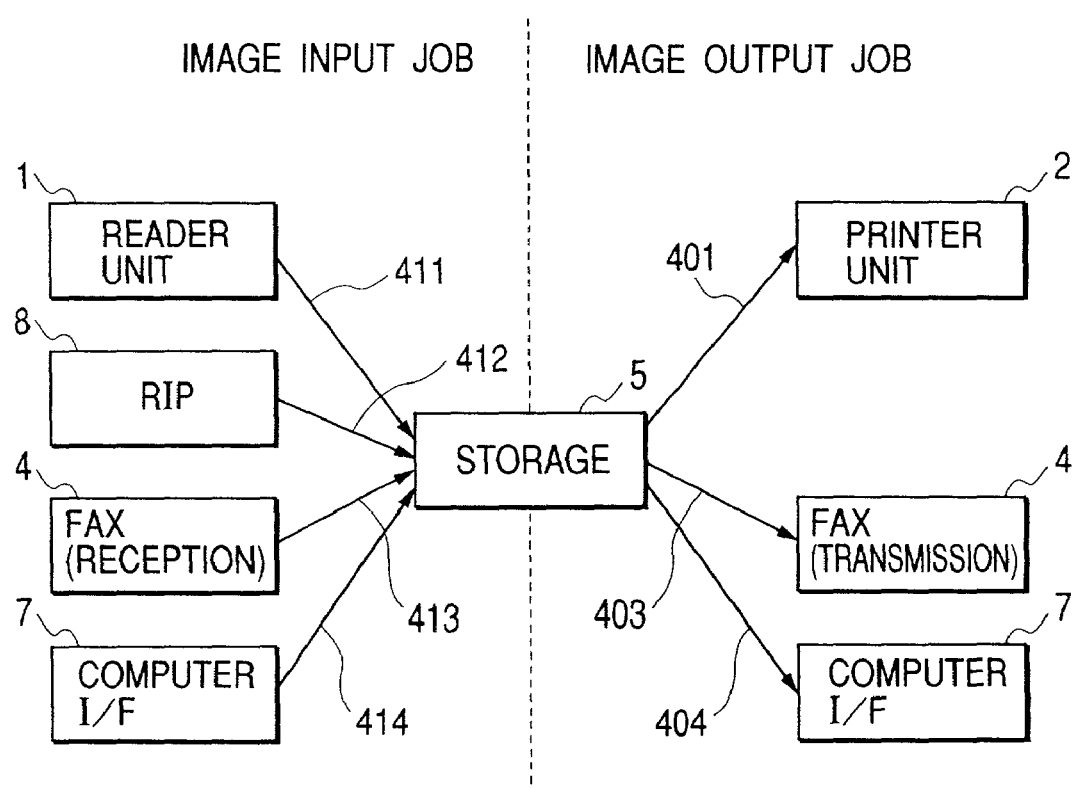
FIG. 5 is a block diagram showing the job control for an image input job and an image output job in the embodiments of the present invention.

In the following there will be explained, with reference to FIG. 5, the job control in the dispersed object environment-adapted image input/output apparatus 12 of the present embodiment. FIG. 5 shows a logical unit of the job control. A unit of the job control is input and output processes for a group of image data containing plural pages. Thus, the controlled job is mainly classified as either an image input job or an image output job.

Image input jobs can be further classified as either an image input job 411 for recording in succession the image data, read by the reader unit 1, into the storage unit 5, an image input job 412 for recording in succession the image data, developed by the RIP unit 8, into the storage unit 5, an image input job 413 for recording in succession the image data, received by the facsimile unit 4, into the storage unit 5, or an image input job 414 for recording in succession the image data, entered from the computer interface unit 7, into the storage unit 5.

Furthermore, the dispersed object environment-adapted image input/output apparatus 12 of the present embodiment can provide a function of utilizing the storage unit 5 for the accumulation of non-image data, and the image input jobs 411 and 414 can also handle non-image data.

Also, image output jobs can be classified as either an image output job 401 for outputting in succession the image data, read from the storage unit 5, to the printer unit 2, an image output unit 403 for outputting in succession the image data, read from the storage unit 5, to the facsimile unit 4, or an image output job 404 for outputting in succession the image data, read from the storage unit 5, to the computer interface unit 7.

Figure 6:
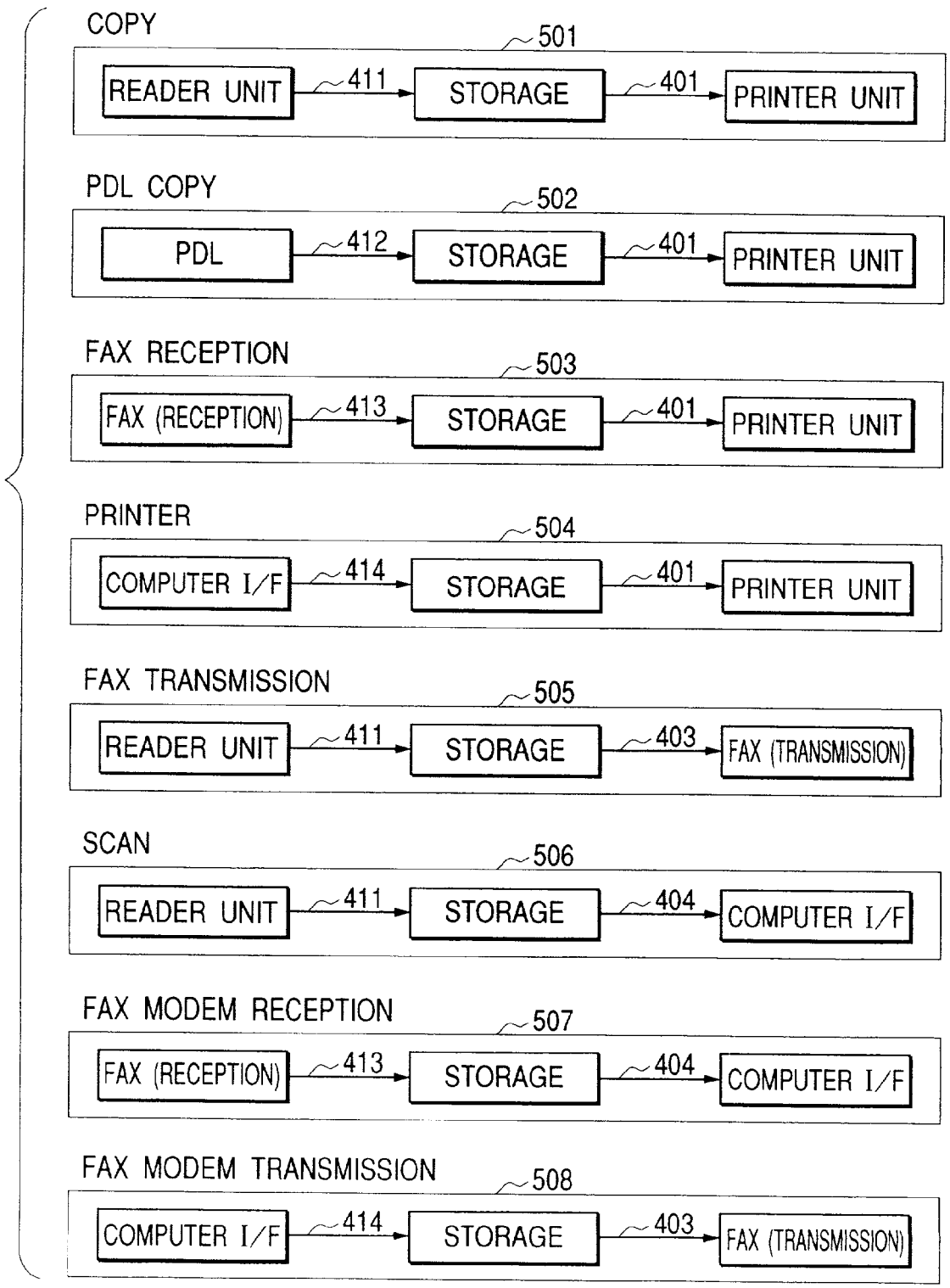
FIG. 6 is a schematic view showing examples of the configuration of sessions in the embodiments of the present invention.

FIG. 6 shows examples of a unit (hereinafter called a "session") formed by combining the above-mentioned plural jobs. A copy session 501 is controlled by a combination of the image input job 411 and the image output job 401. A PDL print session 502 is controlled by a combination of the image input job 412 and the image output job 401. A facsimile reception session 503 is controlled by a combination of the image input job 413 and the image output job 401. A printer session 504 is controlled by a combination of the image input job 414 and the image output job 401. A facsimile transmission session 505 is controlled by a combination of the image input job 411 and the image output job 403. A scan session 506 is controlled by a combination of the image input job 411 and the image output job 404. A facsimile modem reception session 507 is controlled by a combination of the image input job 413 and the image output job 404. A facsimile modem transmission session 508 is controlled by a combination of the image input job 414 and the image output job 403.

A session, thus, is a control unit containing at least one job, and a session may be constituted for example by image input job 412, image output job 401, or a combination of image input job 412, image output job 401 and image output job 403.

Figure 7:
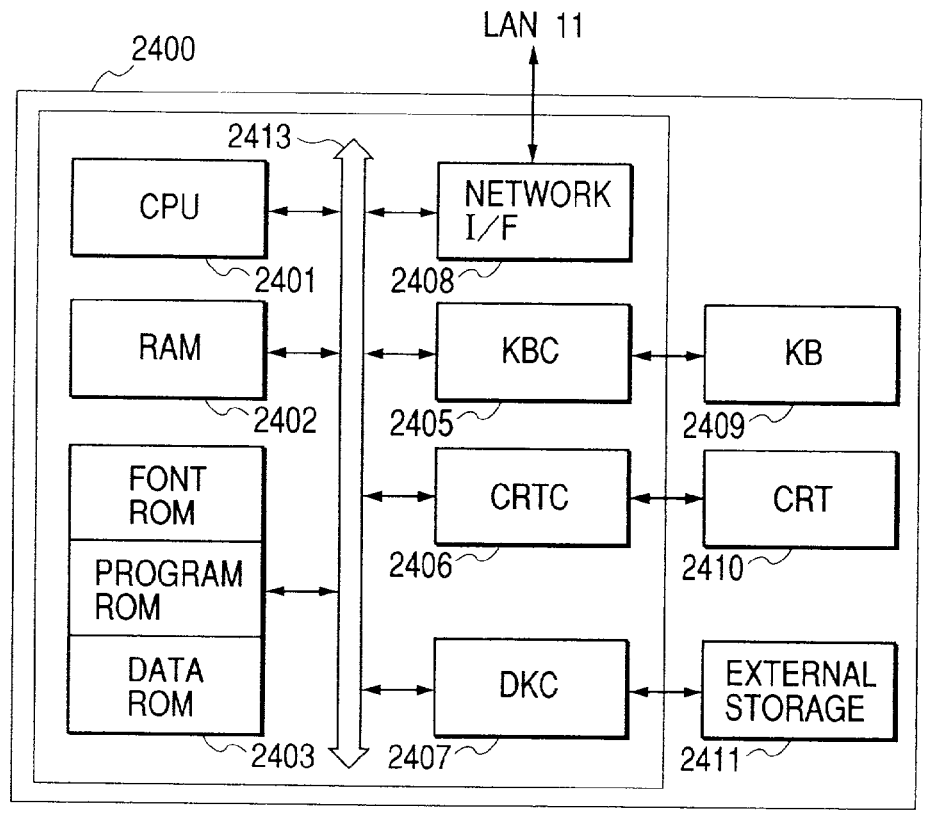
FIG. 7 is a block diagram showing the configuration of a client computer in the embodiments of the present invention.

FIG. 7 shows an example of the system configuration of a host computer to be employed as the client computer 13 shown in FIG. 1. The client computer 13 is featured by the algorithm of the software functioning thereon, of which behavior will be explained later.

Referring to FIG. 6, a host computer 2400 is provided with a CPU 2401 for executing document processing mixedly containing graphics, images, characters and tables (including table calculations) based for example on a document processing program stored in a program ROM contained in a ROM 2403, and comprehensively controls various devices connected to a system bus 2413. The program ROM contained in the ROM 2403 stores for example a control program for the CPU 2401. A RAM 2402 functions as a main memory and a work area for the CPU 2401.

A keyboard controller (KBC) 2405 controls key input from a keyboard 2409 and a pointing device (not shown). A CRT controller (CRTC) 2406 controls the display on a CRT display 2410.

A disk controller (DKC) 2407 controls access to an external storage device 2411 such as a hard disk (HD) or a floppy disk (FD) for storing a boot program, various applications, font data, user files, editing files etc. A network interface (I/F) 2408 executes a communication control process with other host computers or with various input/output devices through the network 11.

The CPU 2401 executes development (rasterization) of the display information for example set on the RAM 2402 into outline font on the RAM, thereby enabling WYSIWYG (what you see is what you get) operation. Also, the CPU 2401 opens various windows based on a command designated for example by a mouse cursor (not shown) on the CRT 2410 and executes various data processings.

Figure 8:
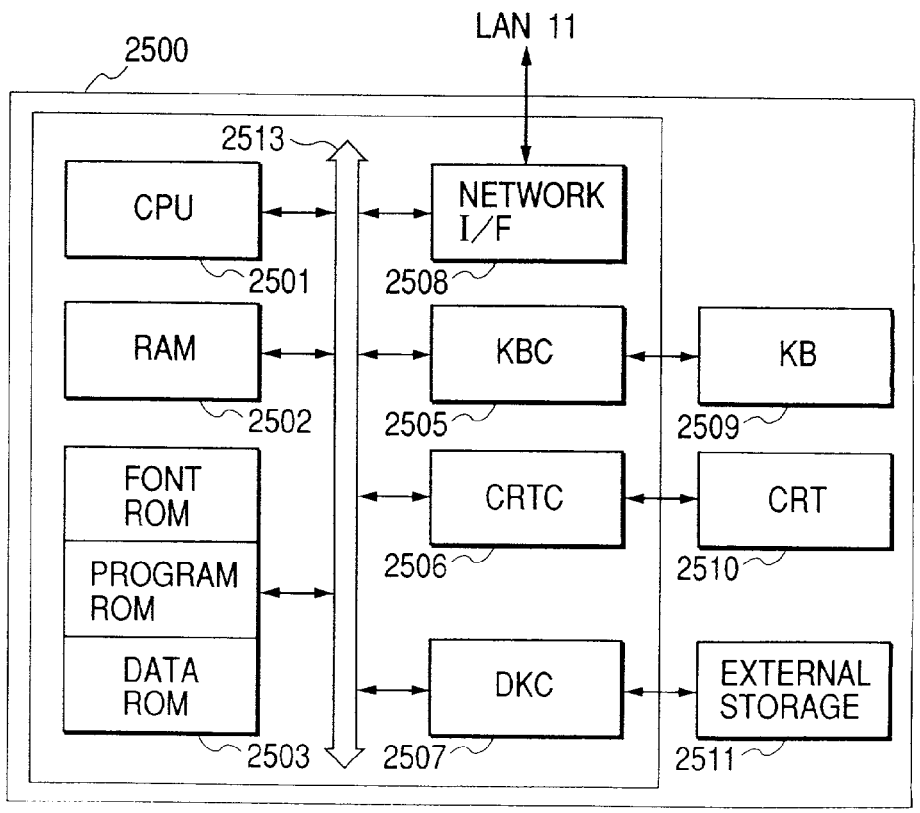
FIG. 8 is a block diagram showing the configuration of a lookup server in the embodiments of the present invention.

FIG. 8 shows an example of the system configuration of a host computer employed similarly to the lookup server computer 14. The lookup server computer 14 can have the well-known hardware configuration of a general-purpose computer, and the featuring function is achieved by the algorithm of the software functioning thereon. For example, such software can function on the hardware of the dispersed object environment-adapted image input/output apparatus 12, and, in such case, the dispersed object environment-adapted image input/output apparatus 12 serves also as the lookup server 14. The behavior of the software will be explained later.

Referring to FIG. 8, a host computer 2500 is provided with a CPU 2501 for executing processes based for example on a program stored in a program ROM contained in a ROM 2503, and comprehensively controls various devices connected to a system bus 2513. A RAM 2502 functions as a main memory and a work area for the CPU 2501. A keyboard controller (KBC) 2505 controls key input from a keyboard 2509 and a pointing device (not shown). A CRT controller (CRTC) 2506 controls the display on a CRT display 2510. A disk controller (DKC) 2507 controls access to an external storage device 2511 such as a hard disk (HD) or a floppy disk (FD) for storing a boot program, various applications, font data, user files, editing files etc. A network interface 2508 executes a communication control process with other host computers or with various input/output devices through the network 11.

In the following there will be briefly explained the dispersed object system of the present embodiment. In the present embodiment, there is employed a dispersed object system similar to the configuration Jini based on Java.

The memory 124 in the core unit 10 shown in FIG. 4 stores a plurality of service objects, each constituting a software unit for utilizing, as a service, the function of the apparatus realized by each session shown in FIG. 6. Such service objects are constituted respectively corresponding to the services provided by the dispersed object environment-adapted image input/output apparatus 12, such as the PDL printing, image printing, image scanning, facsimile transmission, facsimile reception, data accumulation, apparatus management, job management, etc.

The service object is a software configuration called an "object" in the known object-oriented technology, and is provided with an interface for providing the client with a function and a substance for realizing the function, requested through the interface, by the control of the apparatus. In particular, the service object in the present embodiment is an object in the known dispersed object technology, and is so constructed that the service is available by calling the above-mentioned interface not only from client software provided in the local memory space of the apparatus but also from client software provided in a memory space of a remote external apparatus (for example the client computer 13) through the network 11.

In the following there will now be explained the various preferred embodiments of the present invention.

FIRST EMBODIMENT

Figure 9A:
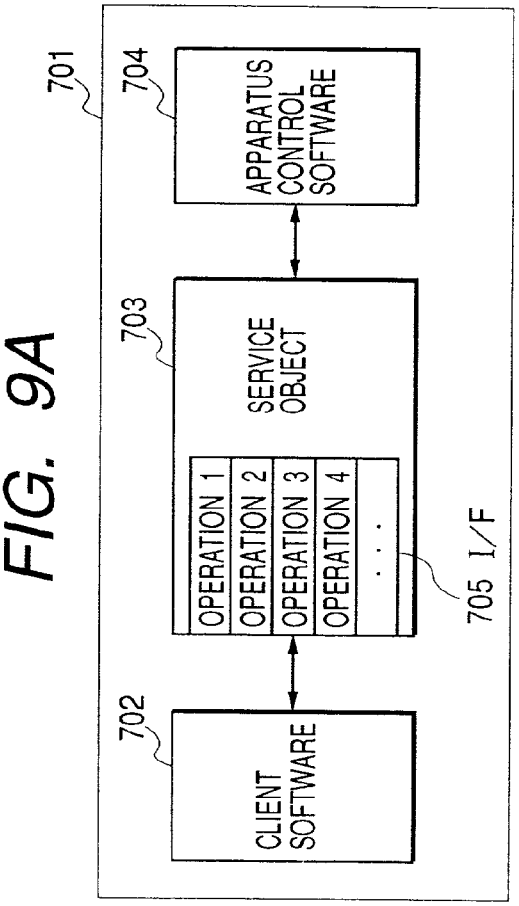
FIGS. 9A and 9B are schematic views showing conceptually the configuration of a service object in first to fourth embodiments of the present invention.
Figure 9B:
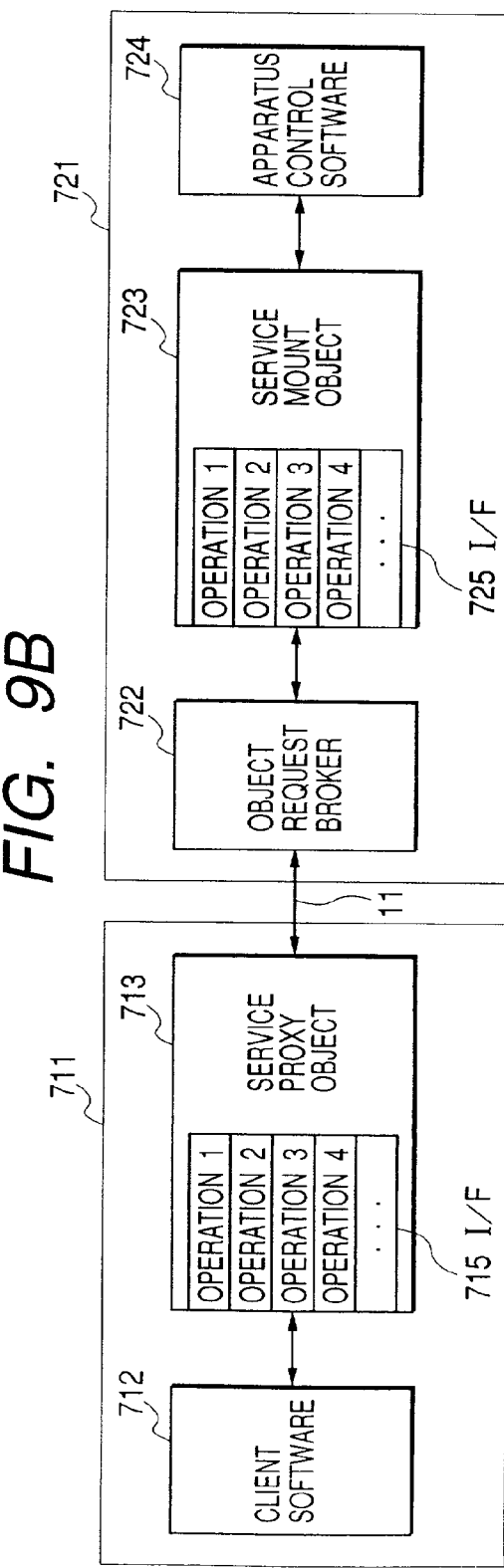

At first there will be explained the schematic configuration of the service object for providing the client with the services, in first to third embodiments of the present invention. FIGS. 9A and 9B conceptually show the configuration of a data accumulation service object, which is one of the service objects.

FIG. 9A shows a general object-oriented system in which a client software 702 utilizes an interface 705 from the space of the memory 124 in the apparatus.

A data accumulation service object 703 provides an interface 705 which the client uses for utilizing the storage unit 5 in the apparatus as a secondary storage device. The interface 705 is provided with an interface defined by a group of operations (operations 1, 2, 3, 4, . . . ) provided by the known general file system, such as "open" for generating a file to be stored in the storage unit 5 or obtaining a descriptor for accessing to an already generated file, "close" for declaring the completion of access to the file, "read" for reading data from a file, "write" for writing data into a file, "unlink" for deleting a file, etc.

When each operation defined by the interface 705 is called, there is activated apparatus control software 704 providing a substance corresponding to the interface 705. As a result, the CPU 123 controls the storage unit 5 so as to realize a predetermined function corresponding to each operation.

The foregoing describes the behavior of the general object-oriented system in which the client software utilizes the interface from the space of the internal memory 124 of the apparatus. Also, as shown in FIG. 9B, the service object of the dispersed object system of the present embodiment provides a service interface to client software in the memory space of a remote apparatus, through the dispersed linkage of a service proxy object 713, provided in the memory space of another remote apparatus (for example, the client computer 13) and a service mount object 723 provided in the internal memory space of the apparatus.

A data accumulation service proxy object 713 provides an interface 715 which the client uses for utilizing the storage unit 5 in the apparatus as a secondary storage device. The interface 715 is provided with an interface same as explained in the foregoing, including for example "open" for generating a file to be stored in the storage unit 5 or obtaining a descriptor for accessing to an already generated file, "close" for declaring the completion of access to the file, "read" for reading data from a file, "write" for writing data into a file, "unlink" for deleting a file, etc.

When each operation defined by the interface 715 is called by the client in the memory space of the remote apparatus, there is activated software for transferring such operation calling request to the apparatus through the network 11. According to such software, the CPU (for example 2401) of the remote apparatus encodes the identifier for identifying the requested operation and the data structure transferred as an argument to the request, into a byte train that can be transmitted through the network 11. Such encoding process is called marshalling or serializing, and can be realizes by certain known technologies.

Then the CPU of the remote apparatus transmits the encoded byte train to the apparatus 12 through the network 11. Such communication is executed by a protocol such as IIOP of OMG (Object-oriented Management Group) or RMI of SUN (Stanford University Network).

In the local memory space of the apparatus 12, a software generally called an object request broker 722 constantly monitors the reception of request data from the network 11. Upon receiving the byte train of the request data from the network 11, the object request broker 722 decodes the byte train to restore the original object operation call and the data structure to be transferred thereto as the argument, thereby calling a corresponding operation of the service mount object 723. Thus, there is activated a control software providing the mount corresponding to the interface 725. As a result, the CCPU 123 control the storage unit 5 thereby realizing the predetermined function corresponding to each operation.

In the foregoing description, the client software 712 need not be programmed in consideration of a fact that the service mount object 723 realizing the service of the apparatus 12 exists in another memory space present across the network 11. Stated differently, since the encoding process for the operation call and the communication process through the network are concealed in the service proxy object 713, the client software 712 can easily utilize the service in the same manner as the service object is present in its own memory space. Such equivalence of the network to the programmer of the client software 712 is one of the important advantages of the dispersed object environment.

Also, the encoding and communication process executed by the service proxy object 713 in the foregoing description is based on a predetermined encoding algorithm and a predetermined communication protocol. Stated differently, these processes can be strictly defined, independently of the interface, which is variable depending on each service object. More specifically, it is possible mechanically to generate the program of the service proxy object 713 by means of a compiler provided by the dispersed object environment (generally called an "IDL compiler") by reading a description strictly defining the interface of the service as data and executing interpretation and conversion processes. Another important advantage of the dispersed object environment is that the programmer constructing the system can easily obtain the program of the service proxy object 713, utilizing the IDL (integrated data oriented language) as a tool.

In the following, there will be explained the function of a system consisting of the client computer 13, the lookup server 14 and the dispersed object environment-adapted image input/output apparatus 12, with emphasis on the function of the lookup server 14.

Figure 10:
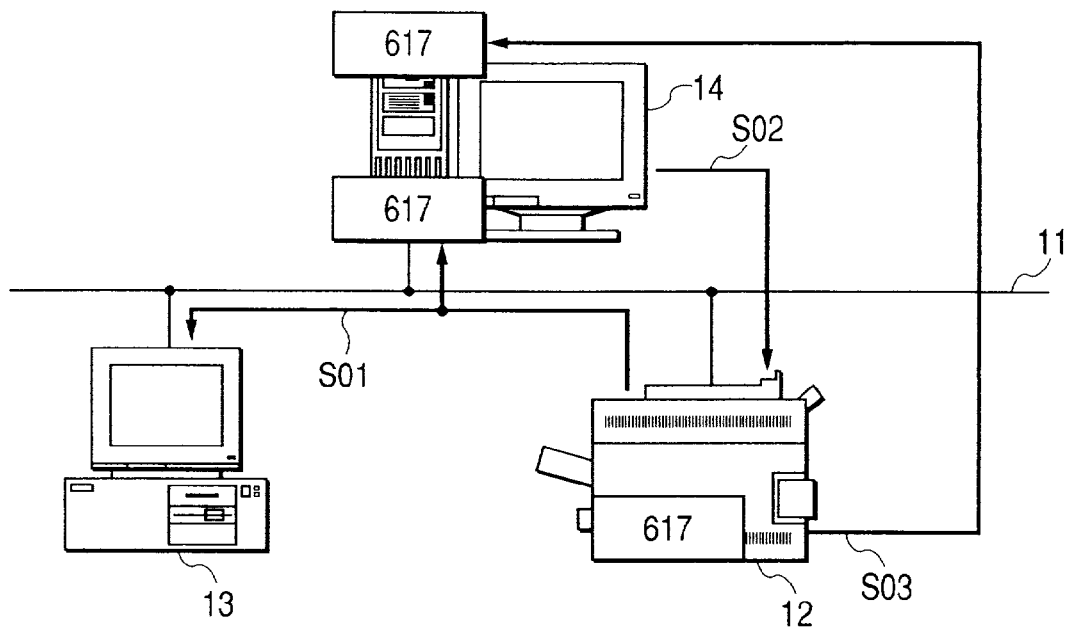
FIG. 10 is a schematic view showing the process flow in which a unit of peripheral equipment registers a service proxy object in the lookup server in the first to third embodiments of the present invention.

FIG. 10 shows the process of uploading the service proxy object from the dispersed object environment-adapted image input/output apparatus 12 of a unit of peripheral equipment to the lookup server 14. At first, the dispersed object environment-adapted image input/output apparatus 12, at the timing of connection to the network 11, emits a broadcast packet inquiring whether the lookup server 14 is present to the network 11 (step S01).

Receiving the broadcast packet, the lookup server 14 informs the presence thereof to the dispersed object environment-adapted image input/output apparatus 12 (step S02).

Then the dispersed object environment-adapted image input/output apparatus 12 registers a driver 617 in the discovered lookup server 14. More specifically, the dispersed object environment-adapted image input/output apparatuses 12-1, 12-2 connected to the network 11 respectively register the service proxy objects 617-1, 617-2 in the lookup server 14 (step S03).

In the lookup server 14, the registered service proxy object is managed together with attribute information such as the date of registration, service name (name of peripheral equipment), service specifications (service content), service location, etc., as shown in FIG. 12. The various types of registered attribute information follow the standard scheme established by the Jini community for each service category such as printer or storage. Also, independent information specific to the service may also be registered as an attribute in the lookup server 14. The lookup server 14 is so constructed as to reply the attributes of the registered service in response to the inquiry from the client software.

Figure 11:
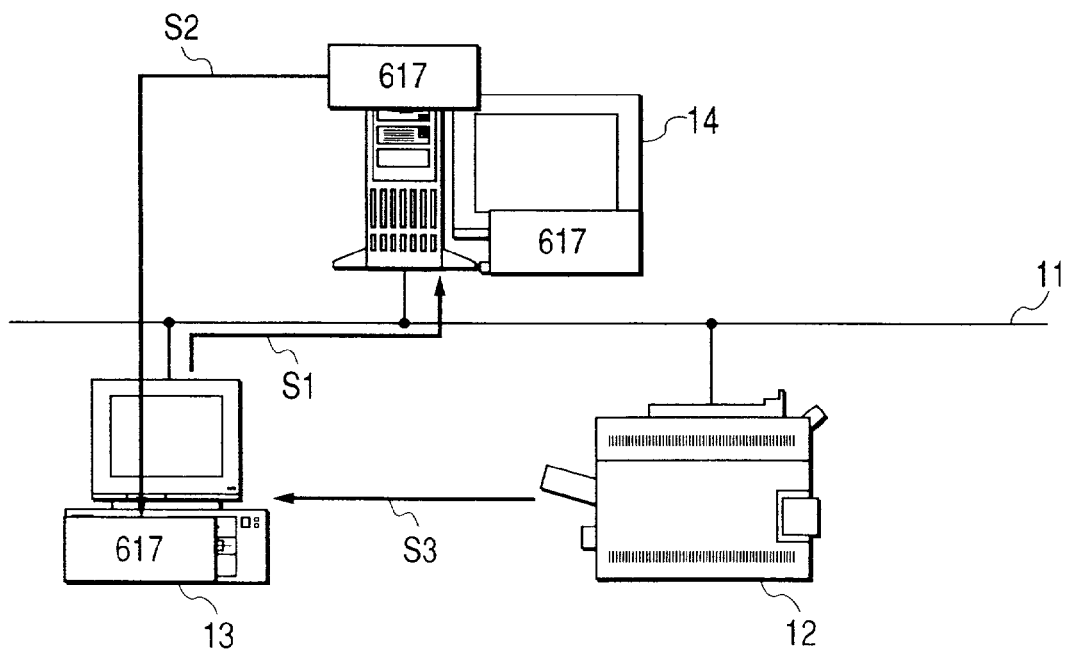
FIG. 11 is a schematic view showing the process flow in which a unit of peripheral equipment of the first to third embodiments of the present invention obtains a service proxy object from the lookup server.

FIG. 11 shows a process of downloading a service proxy object from the lookup server 14 to the client computer 13. In a case the where client computer 13 utilizes the dispersed object environment-adapted image input/output apparatus 12, the client computer 13 at first checks the service proxy objects present in the lookup server 14 corresponding to the services (step S1). Then the client computer 13 downloads a desired service proxy object from the lookup server 14 (step S2), and communicates with the dispersed object environment-adapted image input/output apparatus 12, providing the desired service (step S3).

More specifically, in the case of a request such as "receiving a print service" or "receiving a scanning service", the client computer 13 confirms the registered services by looking at a management table 1801 of the lookup server 14 as shown in FIG. 12 and downloads the desired service from the lookup server 14.

The dispersed object system of the present embodiment adopts a model in which the use right of a service is leased to the client for a predetermined term. More specifically, the dispersed object environment-adapted image input/output apparatus 12 registers its presence in the lookup server 14 utilizing the service thereof, and an effective term is defined also on such registration. The registration expires after a certain period unless the registration is periodically repeated, and the mechanism of such expiration allows one to avoid the drawback that the ineffective information might otherwise continue to be registered in the lookup server 14 in a case where the server constituting the client thereof loses its function, for example, due to a failure in the system.

Figure 13:
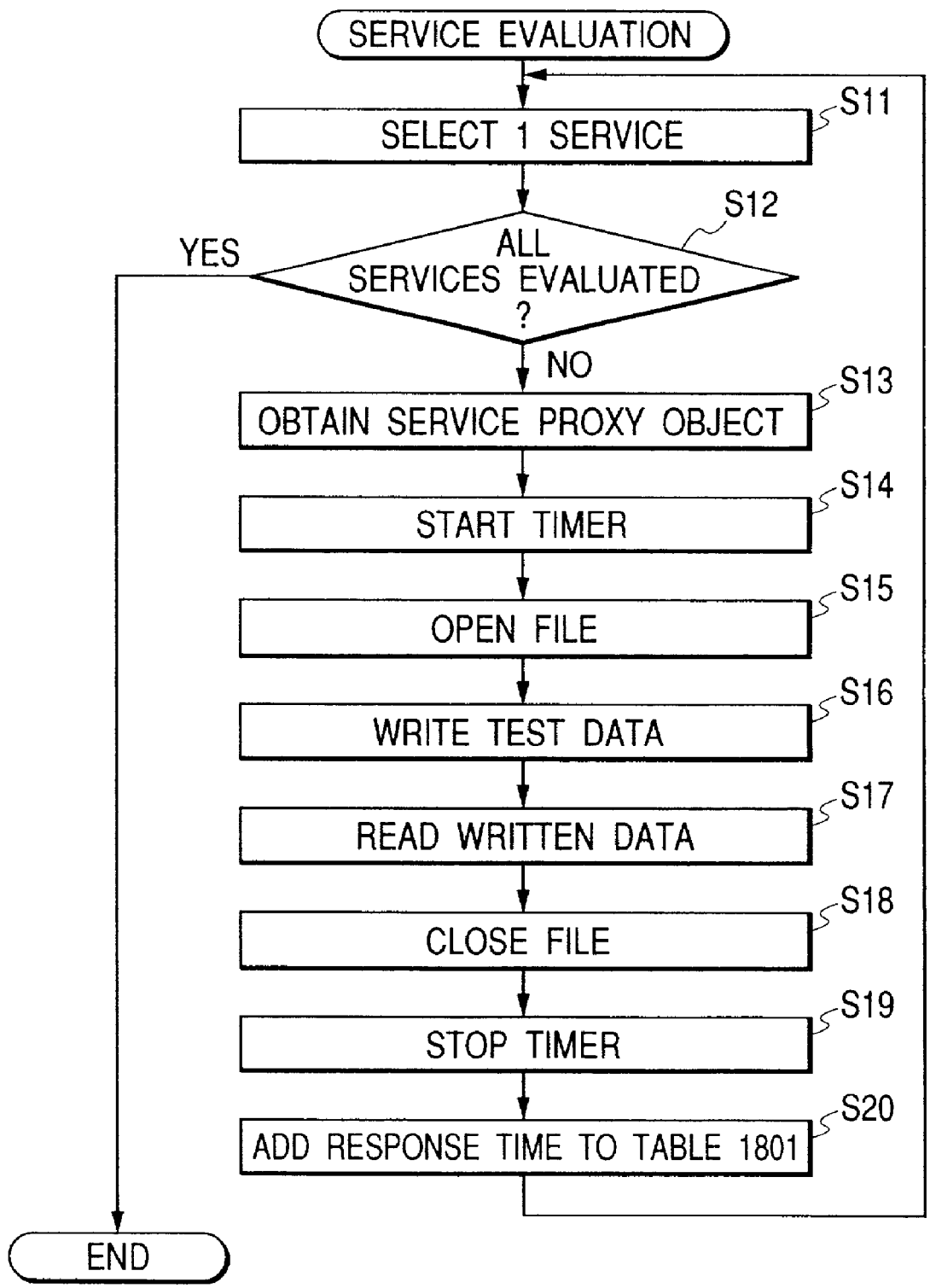
FIG. 13 is a flow chart showing the sequence of a service evaluating process executed by the lookup server of the first embodiment of the present invention.

FIG. 13 is a flow chart showing a service evaluating process executed by the CPU 2501 of the lookup server 14 in the first embodiment of the present invention. The CPU 2501 evaluates the registered information by periodically repeating the service evaluating process, utilizing a timer process based on a timer (not shown).

For the purpose of simplicity, the lookup server 14 of the present embodiment is assumed to be a lookup server exclusively registering the information of a storage service for providing the client with a temporary secondary storage function. The process of the present flow chart is executed parallel to other processes of the lookup server, by a time-shared process of the CPU 2501 of the lookup server 14. The process of the present flow chart is executed, in the lookup server 14, as a pseudo-client utilizing the lookup server 14 itself and the services registered therein.

When the service evaluating process is started, a service is selected (step S11) from the list of the services registered in the management table 1801 as shown in FIG. 12.

The present service evaluating process is terminated if in the next step S12 it is identified that no service is registered in the management table 1801 or that all the registered services have been evaluated. Otherwise, in step S113 the service proxy object of the selected registered service is obtained. The service proxy object is downloaded in the same manner as in the process of the ordinary client, as explained in relation to FIG. 11.

Then, in step S14, the current time is obtained from a timer (not shown) to start the measurement of the time required for the process, and in step S115, an "open" operation is called from the interface 715 of the service proxy object 713 shown in FIG. 9B in the same manner as executed by the ordinary client, thereby opening a file. In step S16 a "write" operation of the service proxy object 713 is called and test data, prepared in advance, is written in the file. In the next step (S17), a "read" operation of the service proxy object 713 is called, and the data written into the file in the preceding step S16 is read. Then in step S18 a "close" operation of the service proxy object 713 is called, thereby closing the file. Then in step S19 the current time is obtained from the aforementioned timer (not shown), and the time required for the serial process is ascertained from the difference between the time obtained in step S14 and the current time. In step S20 there is added, to the management table 1801 shown in FIG. 12, the required time (hereinafter represented as response time) obtained in preceding step S119 as one of the registered attributes for the contemplated service.

The sequence then returns to step S11 for repeating the above-described process for each of all the registered services.

The response time, obtained as the result of evaluation and added as the attribute information to the management table 1801 in the course of the service evaluating process can be replied, similarly to other attributes in the management table 1801, in response to the inquiry from the client.

In the present, first embodiment, as explained in the foregoing, the lookup server 14 tries, as a client, each of the services registered therein and can transmits the information of the response time to the client. As a result, based on the response time information, the client can estimate the performance of such service and that of the network 11 for such service and can thus select the optimum service based on the objective evaluation by the lookup server 14.

The management table 1801 may contain not only the recent response time but also the history of the past several times, or the combination of a best value and a worst value. Also, the response time information may be suitably normalized to provide the client with an index of the service performance ranked for example as A, B, C, . . . .

The lookup server 14 in the first embodiment of the present invention executes, in addition to the trial and evaluation of the service by the service evaluating process shown in FIG. 13 and the process of replying the result of evaluation to the client, a renewal process for the registered information based on the result of evaluation.

Figure 14:
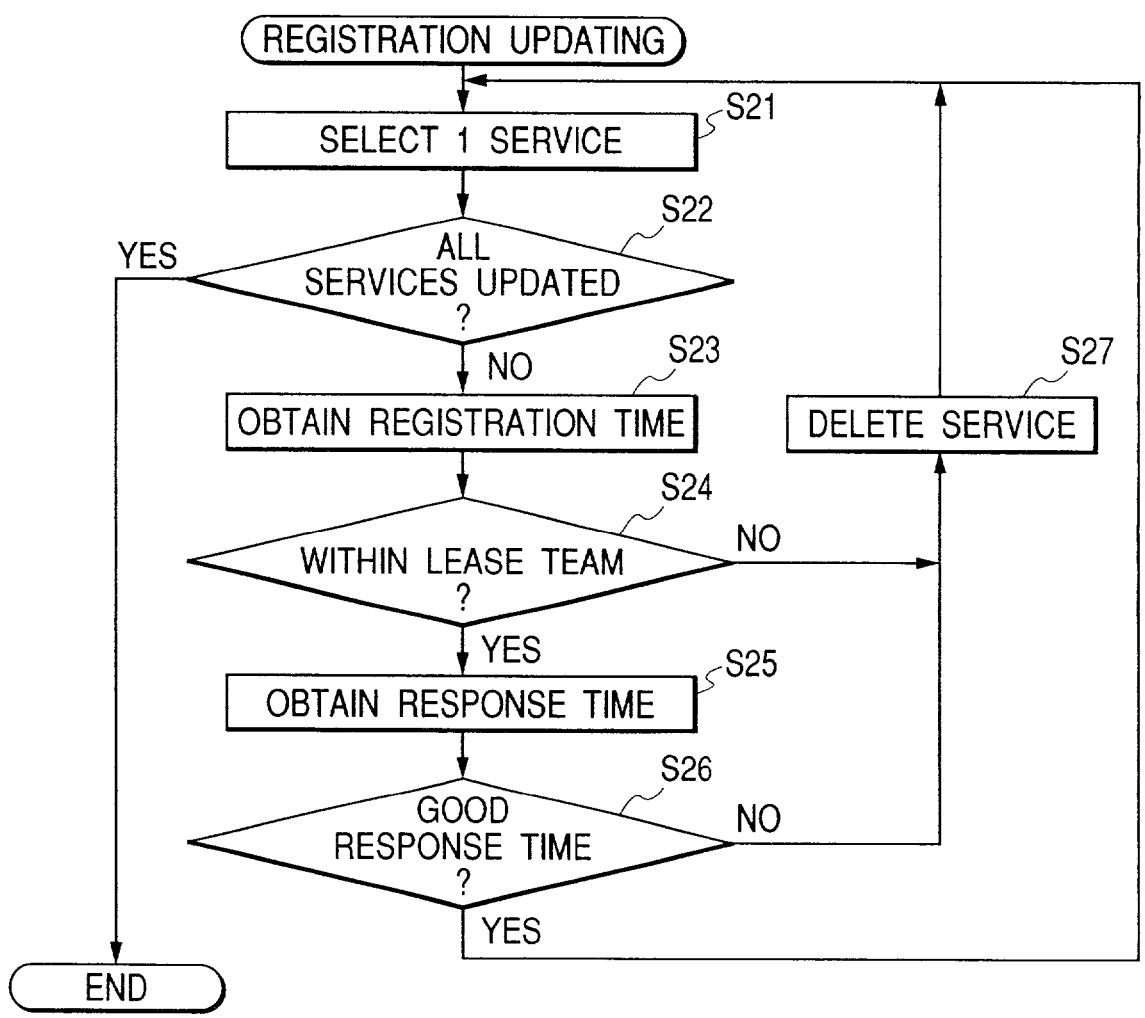
FIG. 14 is a flow chart showing the sequence of a service registration renewing process executed by the lookup server of the first embodiment of the present invention.

FIG. 14 is a flow chart showing the procedure of a service registration renewal process executed by the CPU 2501 of the lookup server 14 in the first embodiment of the present invention. The CPU 2501 renews the registered information by periodically repeating the service registration renewal process, based on a timer process utilizing a timer (not shown). The process of the present flow chart is executed in parallel with other processes of the lookup server by a time-shared process of the CPU 2501 of the lookup server 14.

When the service registration renewal process is started, a service is selected from the list of the services registered in the management table 1801 as shown in FIG. 12 (step S21).

The present service registration renewal process is terminated in a case in which, in the a step S22, it is identified that no service is registered in the management table 1801 or that all the registered services have been renewed. Otherwise, in step S23, the registration time attribute (time of latest lease) of the service is read from the management table 1801. In step S24, a discrimination is made as to whether the difference between the current time and the registration time exceeds the lease term, and, if not, the sequence proceeds to step S25, but otherwise, to step S27.

In step S25 there is read, from the management table 1801, the response time attribute of the service obtained by the recent service evaluating process, and in step S26 the obtained response time is compared with a predetermined reference, and, if the performance is equal to or higher than the reference, the sequence returns to step S21 to repeat the foregoing process to all the registered services. If the performance is less than the reference, the sequence proceeds to step S27.

In step S27 the registration of the service is deleted from the management table 1801. Thereafter the sequence returns to step S21 to repeat the foregoing process for all of the registered services.

In the present first embodiment, as explained in the foregoing, the lookup server 14 tries, as a client, each of the services registered therein and forcedly deletes the registration of the service in a case where the evaluation based on the response time information does not meet a certain standard. In this manner the lookup server 14 can make an effort to guarantee the quality in performance of the registered service. As a result, the client can select an appropriate service, expecting that the services registered in the lookup server 14 are of higher quality on average, in comparison with the services registered in another lookup server that is not executing such process.

SECOND EMBODIMENT

Figure 15:
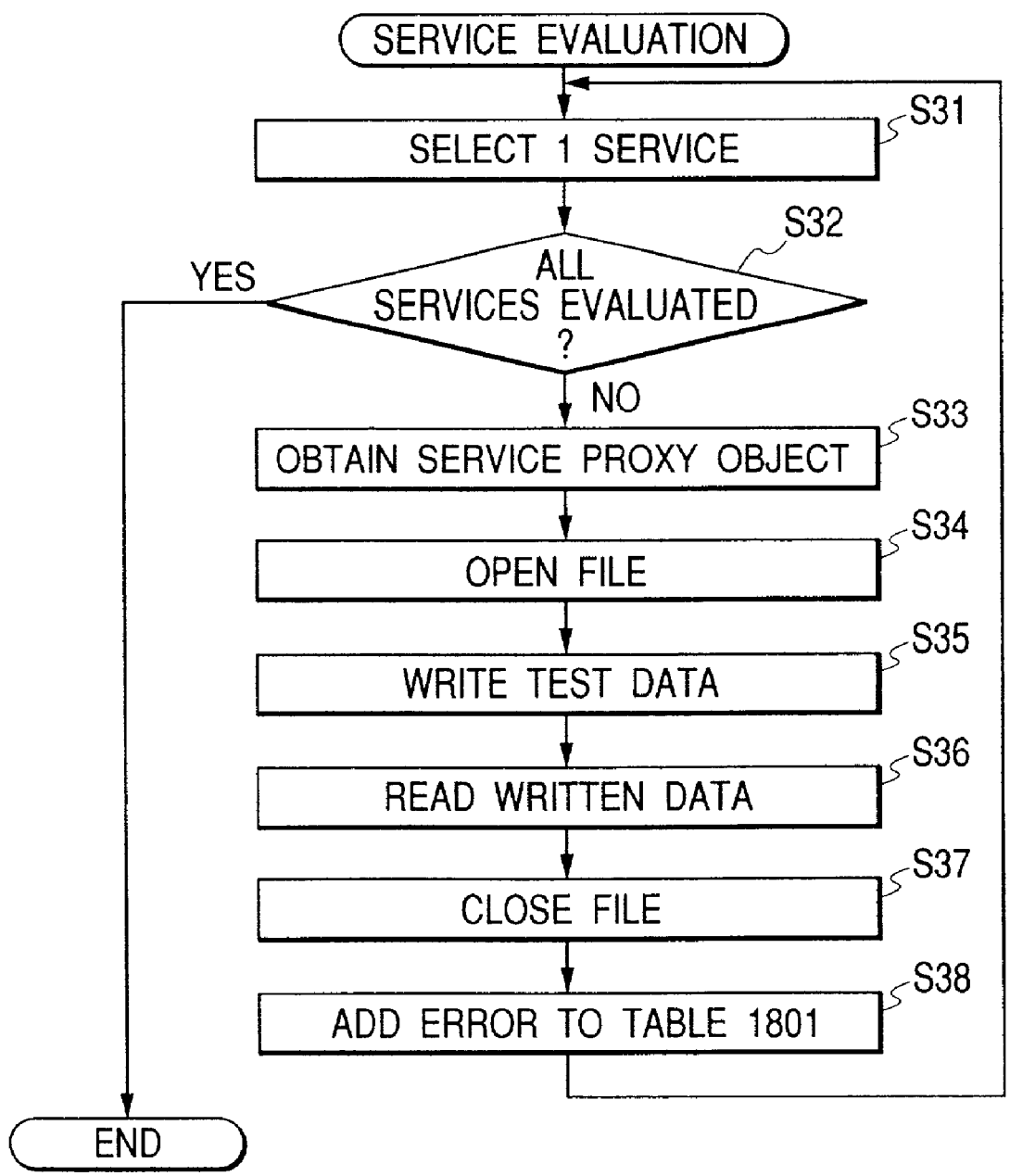
FIG. 15 is a flow chart showing the sequence of a service evaluating process executed by the lookup server of the second embodiment of the present invention.

FIG. 15 is a flow chart showing the sequence of a service evaluating process executed by the CPU 2501 of the lookup server 14 in a second embodiment of the present invention. The CPU 2501 renews the registered information by periodically repeating the service evaluating process, utilizing a timer process based on a timer (not shown).

For the purpose of simplicity, the lookup server 14 of the present embodiment is assumed to be a lookup server exclusively registering the information of a storage service for providing the client with a temporary secondary storage function. The process of the present flow chart is executed on parallel with other processes of the lookup server, by means of a time-shared process of the CPU 2501 of the lookup server 14. The process of the present flow chart is executed, in the lookup server 14, as a pseudo-client utilizing the lookup server 14 itself and the services registered therein.

When the service evaluating process is started, a service is selected from the list of the services registered in the management table 1801 as shown in FIG. 12 9 step S31). The present service evaluating process is terminated if in the next step S32 it is identified that no service is registered in the management table 1801 or that all the registered services have been evaluated. Otherwise, in step S33 there is obtained the service proxy object 713 of the selected registered service. The service proxy object 713 is downloaded in the same manner as in the process of the ordinary client.

Then in step S34 an "open" operation is called from the interface 715 of the service proxy object 713 in the same manner as executed by the ordinary client, thereby opening a file. Then in step S35 a "write" operation of the service proxy object 713 is called and test data, prepared in advance, is written in the file. In the next step S36 a "read" operation of the service proxy object 713 is called, and the data written into the file in the preceding step S35 is read. Then in step S37 a "close" operation of the service proxy object 713 is called, thereby closing the file.

Then in step S38 the data written in step S35 is compared with the data read in step S36, and, if there is a difference therebetween, that fact is identified as an error, and an increment is made on a count indicating the level of abnormality (hereinafter termed an "abnormality count") in an internal counter (not shown). Also, in a case where the result of operation called in each of the foregoing steps indicates an abnormal result such as "busy", the number of such abnormal result is added to the aforementioned abnormal count. If all the steps are completed in the normal manner, on the other hand, an increment is made on a count indicating the level of normality (hereinafter termed a "normality count") in an internal counter (not shown).

The sequence then returns to step S31 to repeat the above-described process for each of all the registered services.

The values of the aforementioned abnormality count and normality count, obtained as the result of evaluation and added as the attribute information to the management table 1801 in the course of the service evaluating process, can be provided, similarly to other attributes in the management table 1801, in response to the inquiry from the client.

In the present embodiment, the presence of error is discriminated by limiting the service to storage and executing an access test to the file, but, in more general manner, the presence of error(s) may be discriminated by calling an operation for executing a "self test" operation or the like provided in all the services.

In the present second embodiment, as explained in the foregoing, the lookup server 14 tries, as a client, each of the services registered therein and can transmit the information on the presence or absence of error to the client. As a result, based on such error information, the client can estimate the reliability of such service and that of the network 11 for reaching such service and can thus select the optimum service based on the objective evaluation by the lookup server 14.

It is also possible to execute maintenance of the registered information based on the reliability of the service, by combining the lookup server 14 of the present embodiment with a service registration renewal process similar to that shown in FIG. 14. In such configuration of the present embodiment, the lookup server 14 tries, as a client, each of the services registered therein and forcedly deletes the registration of the service in a case where the evaluation based on the presence or absence of the error does not meet a certain standard. In this manner the lookup server 14 can make an effort to guarantee the quality in reliability of the registered service. As a result, the client can select an appropriate service, expecting that the services registered in the lookup server 14 are of higher quality on average, in comparison with the services registered in another lookup server that is not executing such process.

THIRD EMBODIMENT

Figure 16:
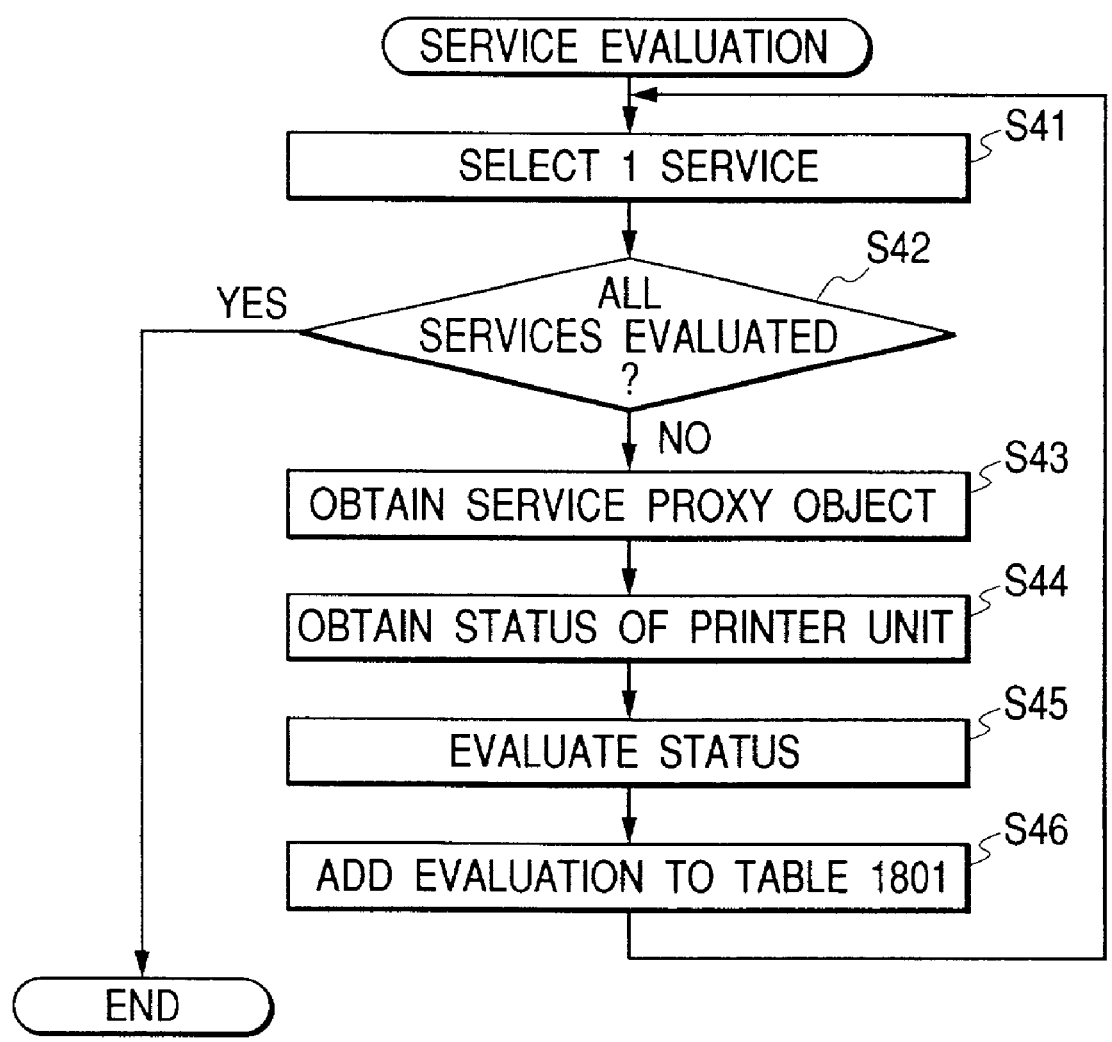
FIG. 16 is a flow chart showing the sequence of a service evaluating process executed by the lookup server of the third embodiment of the present invention.

FIG. 16 is a flow chart showing the sequence of a service evaluating process executed by the CPU 2501 of the lookup server 14 in a third embodiment of the present invention. The CPU 2501 renews the registered information by periodically repeating the service evaluating process, utilizing a timer process based on a timer (not shown).

For the purpose of simplicity, the lookup server 14 of the present embodiment is assumed as a lookup server exclusively registering the information of a printing service. The process of the present flow chart is executed in parallel with other processes of the lookup server, by a time-shared process of the CPU 2501 of the lookup server 14. The process of the present flow chart is executed, in the lookup server 14, as a pseudo-client utilizing the lookup server 14 itself and the services registered therein.

When the service evaluating process is started, a service is selected in step S41 from the list of the services registered in the management table 1801 as shown in FIG. 12. The present service evaluating process is terminated if in the next step S42 it is identified that no service is registered in the management table 1801 or that all the registered services have been evaluated. Otherwise, in step S43 there is obtained the service proxy object 713 of the selected registered service. The service proxy object 713 is downloaded in the same manner as in the process of the ordinary client.

Then in step S44 a state obtaining operation is called from the interface 715 of the service proxy object 713 in the same manner as executed by the ordinary client, thereby obtaining dynamic state information of the printer unit 2. Then in step S45 the state information obtained in the preceding step S44 is evaluated according to a predetermined algorithm. This algorithm is defined by an evaluating function of a wide sense, for example providing a significant negative point for example if the color toners or inks are exhausted in a color printer, and a negative point for example if a large-sized printing sheet is exhausted in a large-sized printer.

Then in step S46 there is added, to the management table 1801, the results of evaluation (for example the negative point) as an attribute of the service. Step S46 may include appropriate reforming the latest state information of the apparatus obtained in step S44 and adding such information as one of the registered attributes of the service to the management table 1801. The sequence then returns to step S41 for repeating the above-described process for each of all the registered services.

The result of the above-described evaluation, added as the attribute information to the management table 1801 in the course of the service evaluating process, can be provided, similarly to other attributes in the management table 1801, in response to the inquiry from the client.

In the present third embodiment, as explained in the foregoing, the lookup server 14 tries, as a client, each of the services registered therein and can transmit the evaluation based on the dynamic state (and dynamic state information itself) to the client. As a result, the client can know the important state information relating to the service and the evaluation thereof prior to the selection of a service and the downloading of the proxy object thereof, and can thus select the optimum service.

It is also possible to execute maintenance of the registered information based on the reliability of the service, by combining the lookup server 14 of the present embodiment with a service registration renewal process similar to that shown in FIG. 14. In such configuration of the present embodiment, the lookup server 14 tries, as a client, each of the services registered therein and forcedly deletes the registration of the service in a case where the evaluation based on the reliability does not meet a certain standard. In this manner the lookup server 14 can make an effort to guarantee the quality of the registered service, based on the dynamic state thereof. As a result, the client can select an appropriate service, expecting that the services registered in the lookup server 14 are of higher quality on average, in comparison with the services registered in another lookup server that is not executing such process.

FOURTH EMBODIMENT

Figure 17:
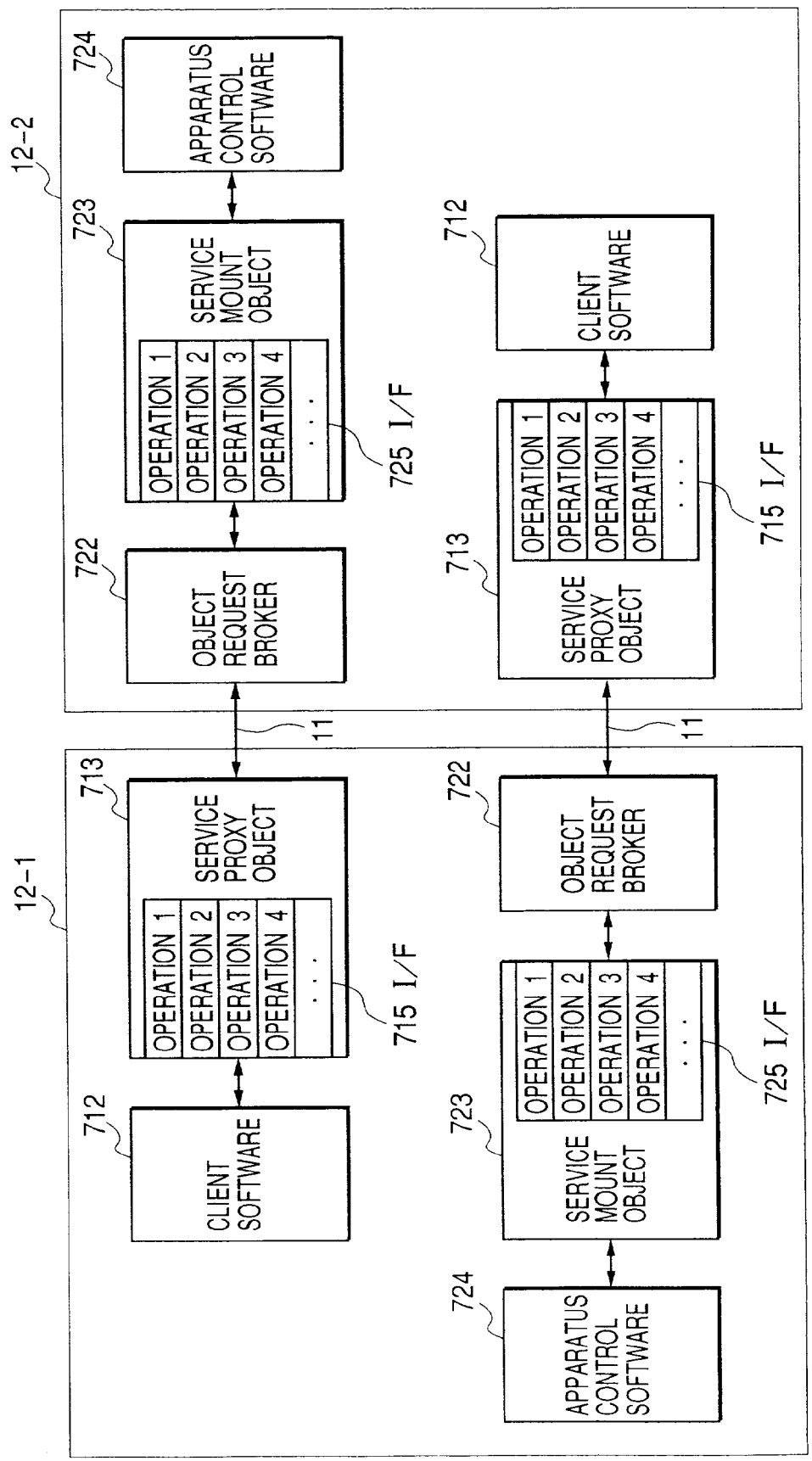
FIG. 17 is a schematic view showing the software configuration of an image input apparatus adapted to an environment of two dispersed objects constituting a pair and mutually monitoring each other.

FIG. 17 schematically shows a software configuration in fourth to seventh embodiments of the present invention to be explained in the following, wherein the dispersed object environment-adapted image input/output apparatuses 12-1 and 12-2 connected to the network 11 constitute a pair in which each function as the client of the services of the other and try such services of the other. In FIG. 17, components equivalent to those in FIGS. 9A and 9B are represented by corresponding numbers.

As shown in FIG. 17, the dispersed object environment-adapted image input/output apparatuses 12-1, 12-2 have similar software configurations in which the object request broker 722 of either apparatus is connected with the service proxy object 713 of the other apparatus through the network 11.

Figure 18:
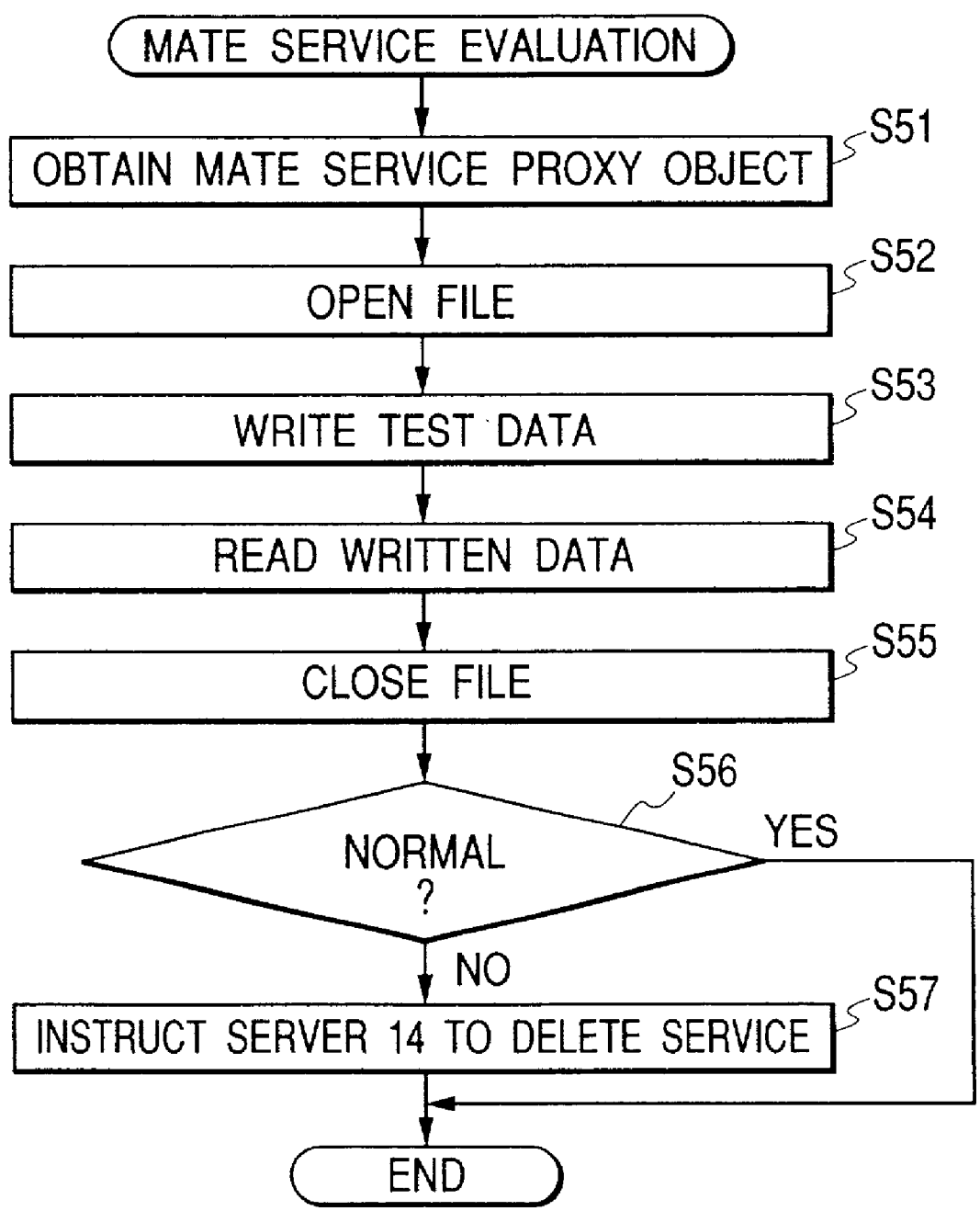
FIG. 18 is a flow chart showing the sequence of a service evaluating process executed by an image input/output apparatus adapted to the dispersed object environment in a fourth embodiment of the present invention.

FIG. 18 is a flow chart showing the sequence of a service evaluating process, executed by each of the CPUs 123 of the dispersed object environment-adapted image input/output apparatuses 12-1, 12-2 of the fourth embodiment of the present invention, on the services of the other. The CPU 123 evaluates the quality of the service of the other apparatus by periodically repeating the present service evaluating process by a timer process based on a timer (not shown).

For the purpose of simplicity, the present embodiment deals, among the services provided by the dispersed object environment-adapted image input/output apparatuses 12, with the storage service of providing the client with the temporary secondary storage function. The process of the present flow chart is executed, by a time-shared process of the CPU 123 of the dispersed object environment-adapted image input/output apparatus 12, in parallel with other processes required in the apparatus. The process of the present flow chart is executed as a pseudo-client in the dispersed object environment-adapted image input/output apparatus 12, utilizing the services of the other image input/output apparatus 12.

When the service evaluating process is started, in step S51 there is obtained the service proxy object 713 of the other from the lookup server 14. The service proxy object 713 is downloaded in the same manner as in the process of the ordinary client.

Then in step S53 a "write" operation of the service proxy object 713 is called, and test data, prepared in advance, is written in the file. in the next step S54 a "read" operation of the service proxy object 713 is called, and the data written into the file in the preceding step S53 is read. Then in step S55 a "close" operation of the service proxy object is called, thereby closing the file.

Then in step S56 the data written into the file in the foregoing step S53 is compared with the data read in step S54, and, if there is a difference therebetween, the sequence proceeds to step S57. Also, in a case where the result of operation in each of the foregoing steps indicates an abnormal value such as "busy" or expiration of response time, the sequence proceeds to step S57. On the other hand, if all the steps are completed in normal manner, then in step S56 the present service evaluating process is terminated.

In step S57 a forced service registration deleting process of the lookup server 14 is called, so as to delete the registration of the service of the other, on which the abnormality is observed, from the lookup server 14. The present service evaluating process is thereafter terminated.

In the present embodiment, the presence of an error is discriminated by limiting the service to storage 5 and executing an access test of access to the file, but, in more general manner, the presence of error may be discriminated by calling an operation for executing a "self test" operation or the like provided in all the services.

In the present fourth embodiment, as explained in the foregoing, each of the plural dispersed object environment-adapted image input/output apparatuses 12 mutually tries the services of the other and, in the case of the detection of an abnormality, the deletion of the registration of the abnormal service can be promptly instructed to the lookup server 14. It is rendered possible to shorten the time of continued registration of an ineffective service in the lookup server 14 and to reduce the danger that the client may try to utilize an ineffective service.

FIFTH EMBODIMENT

Figure 19:
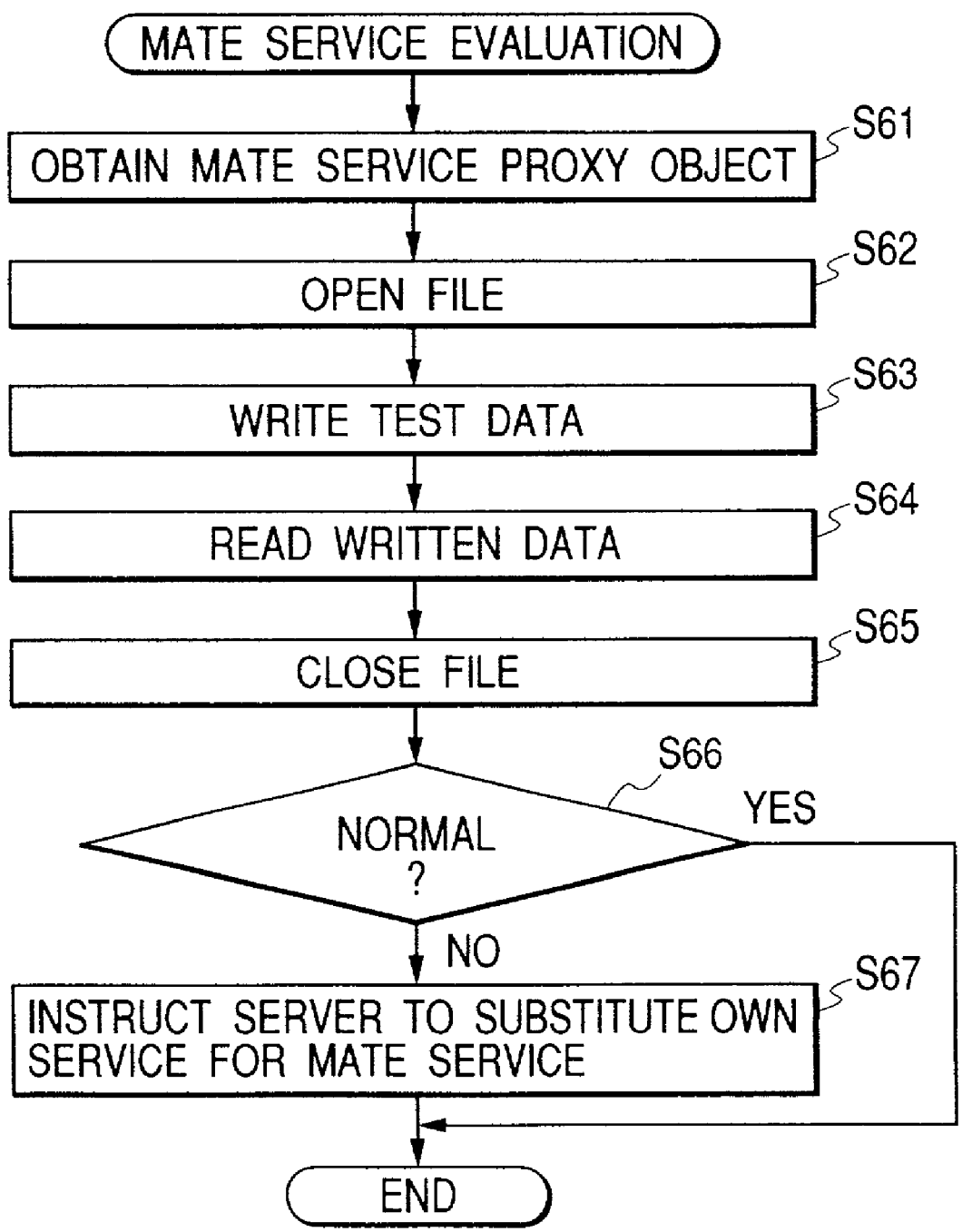
FIG. 19 is a flow chart showing the sequence of a service evaluating process executed by an image input/output apparatus adapted to the dispersed object environment in a fifth embodiment of the present invention.

FIG. 19 is a flow chart showing the sequence of a service evaluating process in a fifth embodiment of the present invention, executed respectively by each of the CPUs 123 of the dispersed object environment-adapted image input/output apparatuses 12, on the service of the other of paired apparatuses. The CPU 123 evaluates the quality of the service of the other apparatus by periodically repeating the present service evaluating process by a timer process based on a timer (not shown).

For the purpose of simplicity, the present embodiment deals, among the services provided by the dispersed object environment-adapted image input/output apparatuses 12, with the storage service of providing the client with the temporary secondary storage function. The process of the present flow chart is executed, by a time-shared process of the CPU 123 of the dispersed object environment-adapted image input/output apparatus 12, in parallel with other processes required in the apparatus. The process of the present flow chart is executed as a pseudo-client in the dispersed object environment-adapted image input/output apparatus 12, utilizing the services of the other image input/output apparatus 12.

When the service evaluating process is started, in step S61 the service proxy object 713 of the other is obtained from the lookup server 14. The service proxy object 713 is downloaded in the same manner as in the process of the ordinary client. Then in step S62 an "open" operation is called from the interface of the service proxy object 713 in the same manner as executed by the ordinary client, thereby opening a file.

Then in step S63 a "write" operation of the service proxy object 713 is called, and test data, prepared in advance, is written in the file. in the next step S64 is called a "read" operation of the service proxy object 713 and the data written into the file in the preceding step S63 is read. Then in step S65 is called a "close" operation of the service proxy object 713, thereby closing the file. Then in step S66 a comparison is made of the data written into the file in the foregoing step S63 with the data read in step S64, and, if there is a difference therebetween, the sequence proceeds to step S67. Also, in a case where the result of operation in each of the foregoing steps indicates an abnormal value such as "busy" or expiration of response time, the sequence proceeds to step S67.

On the other hand, if all the steps are completed in normal manner, then in step S66 the present service evaluating process is terminated.

In step S67 a service transfer instructing process of the lookup server 14 is called so as to introduce a service provided by the apparatus itself as a proxy for the service of the other, in which the abnormality is observed, and the present service evaluating process is thereafter terminated.

When the above-mentioned service transfer instructing operation is called, the lookup server 14 sets the identification information of the designated transfer service, as a substitute attribute in the record of the corresponding service in the management table 1801 shown in FIG. 12.

In the present embodiment, the presence of an error is discriminated by limiting the service to the storage unit 5 and executing an access test of access to the file, but, in more general manner, the presence of error may be discriminated by calling an operation for executing a "self test" operation or the like provided in all the services.

Figure 20:
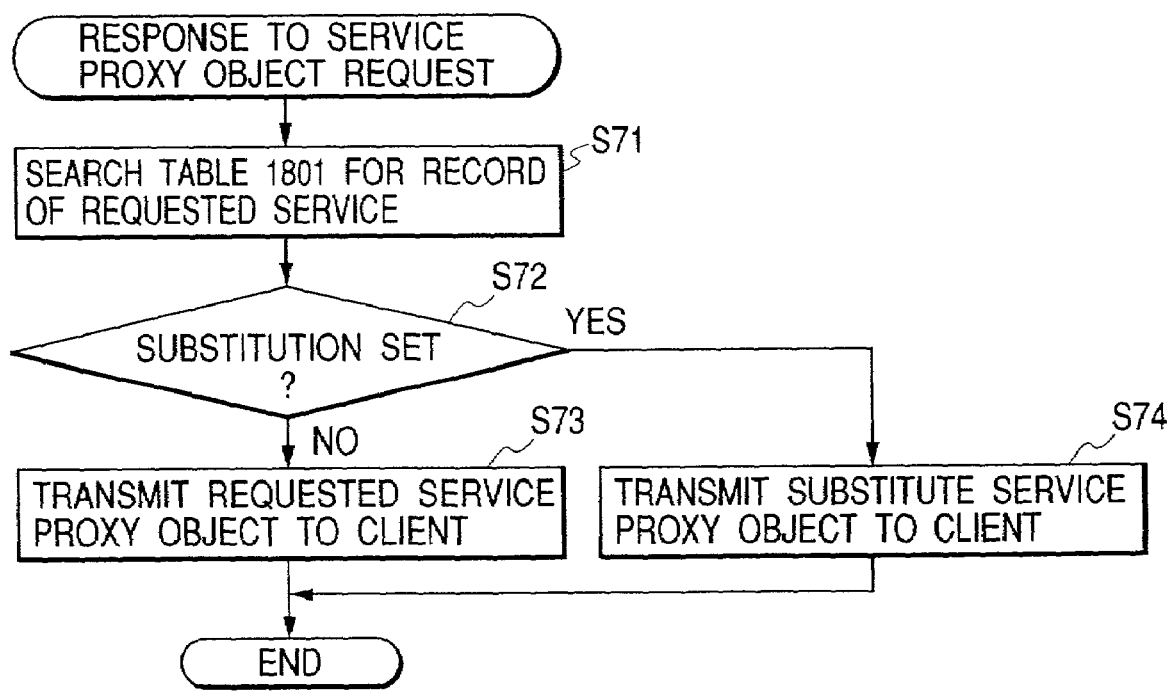
FIG. 20 is a flow chart showing the sequence of a response process to a request for obtaining a service proxy object, executed by a lookup server the fifth embodiment of the present invention.

FIG. 20 is a flow chart showing the sequence of a response process to a request for obtaining the service proxy object, to be executed by the CPU 2501 of the lookup server 14 in the fifth embodiment of the present invention, at the reception from the client of a request for downloading of the service proxy object 713.

At first, in step S71 a search is made, in the management table 1801 shown in FIG. 12, for a record corresponding to the service designated by the client. In the next step S72 it is discriminated whether a substitute attribute is set in the searched record, and, if not, the sequence proceeds to step S73, but, if set, the sequence proceeds to step S74.

In step S73 the service proxy object of the designated service is transmitted to the client. In step S74 there is transmitted, to the client, the service proxy object of a substitute service designated by the identification information set in the substitute attribute.

In the present fifth embodiment, as explained in the foregoing, each of the plural dispersed object environment-adapted image input/output apparatuses 12 mutually tries the services of the other and, in case of the detection of an abnormality, the lookup server 14 can be promptly instructed to transfer the request of the client for an abnormal service to the service of the normal side. It is thus rendered possible to shorten the time of continued registration of an ineffective service in the lookup server 14 and thus to reduce the danger that the client may try to utilize an ineffective service. Also, the client wishing to utilize the ineffective service is automatically given an equivalent substitute service, whereby the usability of such service can be improved.

SIXTH EMBODIMENT

Figure 21:
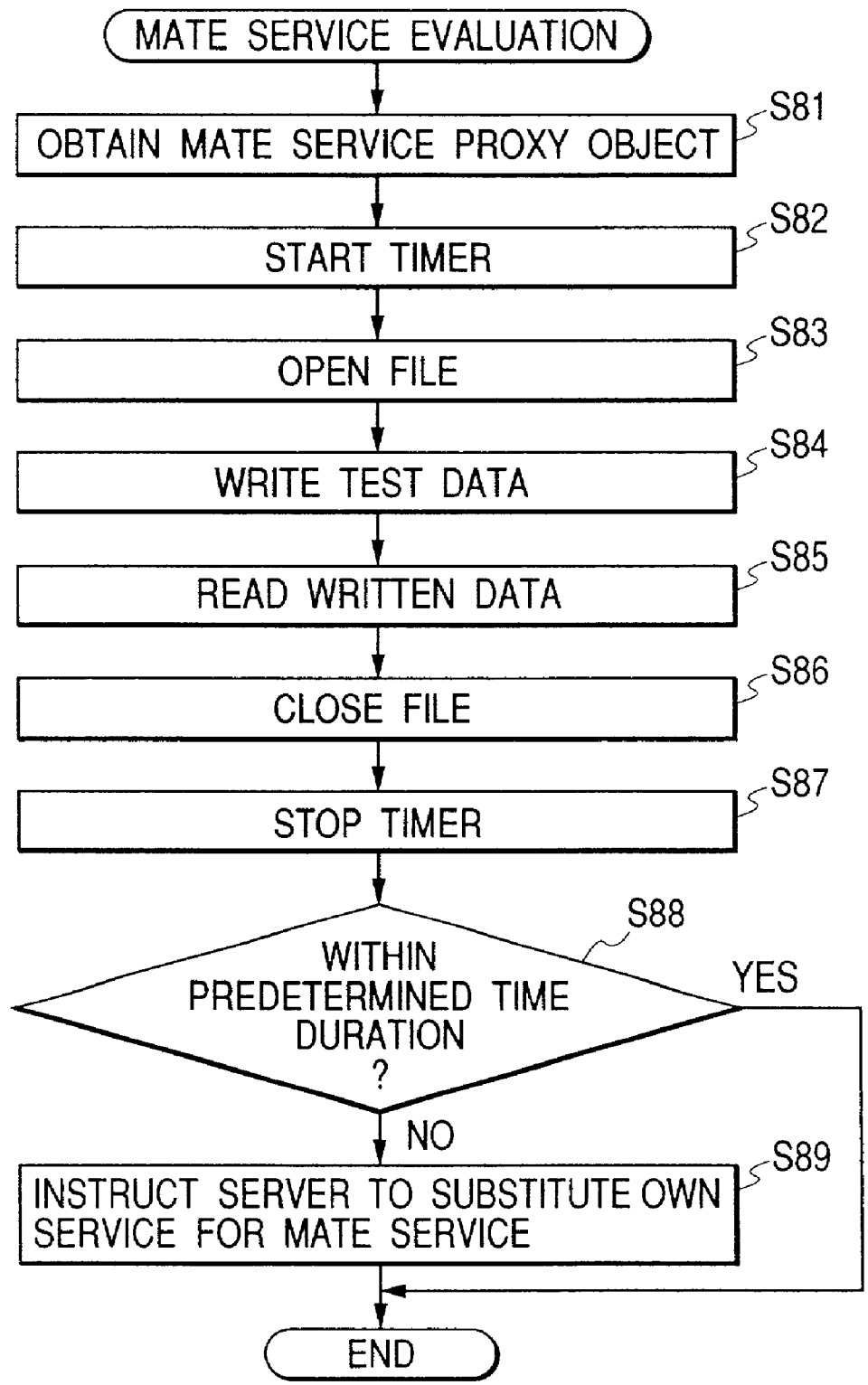
FIG. 21 is a flow chart showing the sequence of a service evaluating process executed by an image input/output apparatus adapted to the dispersed object environment in a sixth embodiment of the present invention.

FIG. 21 is a flow chart showing the sequence of a service evaluating process in a sixth embodiment of the present invention, executed respectively by each of the CPUs 123 of the dispersed object environment-adapted image input/output apparatuses 12, on the service of the other of paired apparatuses. The CPU 123 evaluates the quality of the service of the other apparatus by periodically repeating the present service evaluating process by a timer process based on a timer (not shown).

For the purpose of simplicity, the present embodiment deals, among the services provided by the dispersed object environment-adapted image input/output apparatuses 12, with the storage service of providing the client with the temporary secondary storage function. The process of the present flow chart is executed, by a time-shared process of the CPU 123 of the dispersed object environment-adapted image input/output apparatus 12, in parallel with other processes required in the apparatus. The process of the present flow chart is executed as a pseudo-client in the dispersed object environment-adapted image input/output apparatus 12, utilizing the services of the other image input/output apparatus 12.

When the service evaluating process is started, in step S81 the service proxy object 713 of the other is obtained from the lookup server 14. The service proxy object 713 is downloaded in the same manner as in the process of the ordinary client. Then in step S82 the current time is obtained from a timer (not shown), thereby starting to measure the time required for the following process. Then in step S83 is called an "open" operation from the interface 715 of the service proxy object 713 in the same manner as executed by the ordinary client, thereby opening a file.

Then in step S84 a "write" operation of the service proxy object 713 is called, and test data, prepared in advance, is written in the file. In the next step S85 is called a "read" operation of the service proxy object 713, and the data written into the file in the preceding step S84 is read. Then in step S86 is called a "close" operation of the service proxy object 713, thereby closing the file.

Then in step S87 is obtained the current time from the aforementioned timer (not shown), and the time required for the process is obtained, based on the difference from the time obtained in step S82. Then in step S88 is compared such required time with a predetermined reference time, thereby discriminating whether predetermined performance is achieved. If the desired level of performance is achieved, the present service evaluating process is terminated.

If the predetermined performance is not achieved, the sequence proceeds to step S89, where there is called a service transfer instructing operation in order to introduce, to the client, a service provided by itself as a substitute for the service of the other, which is not achieving the predetermined performance, whereupon the present service evaluating process is terminated.

When the above-mentioned service transfer instructing operation is called, the lookup server 14 sets the identification information of the designated transfer service, as a substitute attribute in the record of the corresponding service in the management table 1801 shown in FIG. 12.

As in the foregoing sixth embodiment, the CPU 2501 of the lookup server 14 of the present embodiment executes a response process for the substitute object obtaining request as shown in FIG. 20, upon receiving the request for downloading the service proxy object from the client shown in FIG. 20.

In the present sixth embodiment, as explained in the foregoing, each of the paired dispersed object environment-adapted image input/output apparatuses 12 mutually tries the services of the other and, in case of the detection of a loss in the service performance of the other, the lookup server 14 can be promptly so instructed as to transfer the request of the client for a service of the other to a service of the own side. In a case where such loss in the performance indicates an abnormality in the service of the other, there can be obtained advantages similar to those in the fifth embodiment. Also, in a case where such loss in the performance is a normal occurrence resulting from the concentration of loads, the request for the service of the other which is under a highly loaded situation can be shifted to the service of the first apparatus itself, whereby the loads can be dispersed between the paired apparatuses and a very simple load balancing can be realized in a simple manner. In the latter situation, the service of the other sooner or later renews the registration in the lookup server 14 prior to the expiration of the lease term, whereupon the setting for transfer to the substitute service is canceled.

The performance of the service of the other apparatus may be evaluated not only by the latest response time but also by the history of the past several results, or by the average thereof, or by the best and worst values.

SEVENTH EMBODIMENT

Figure 22:
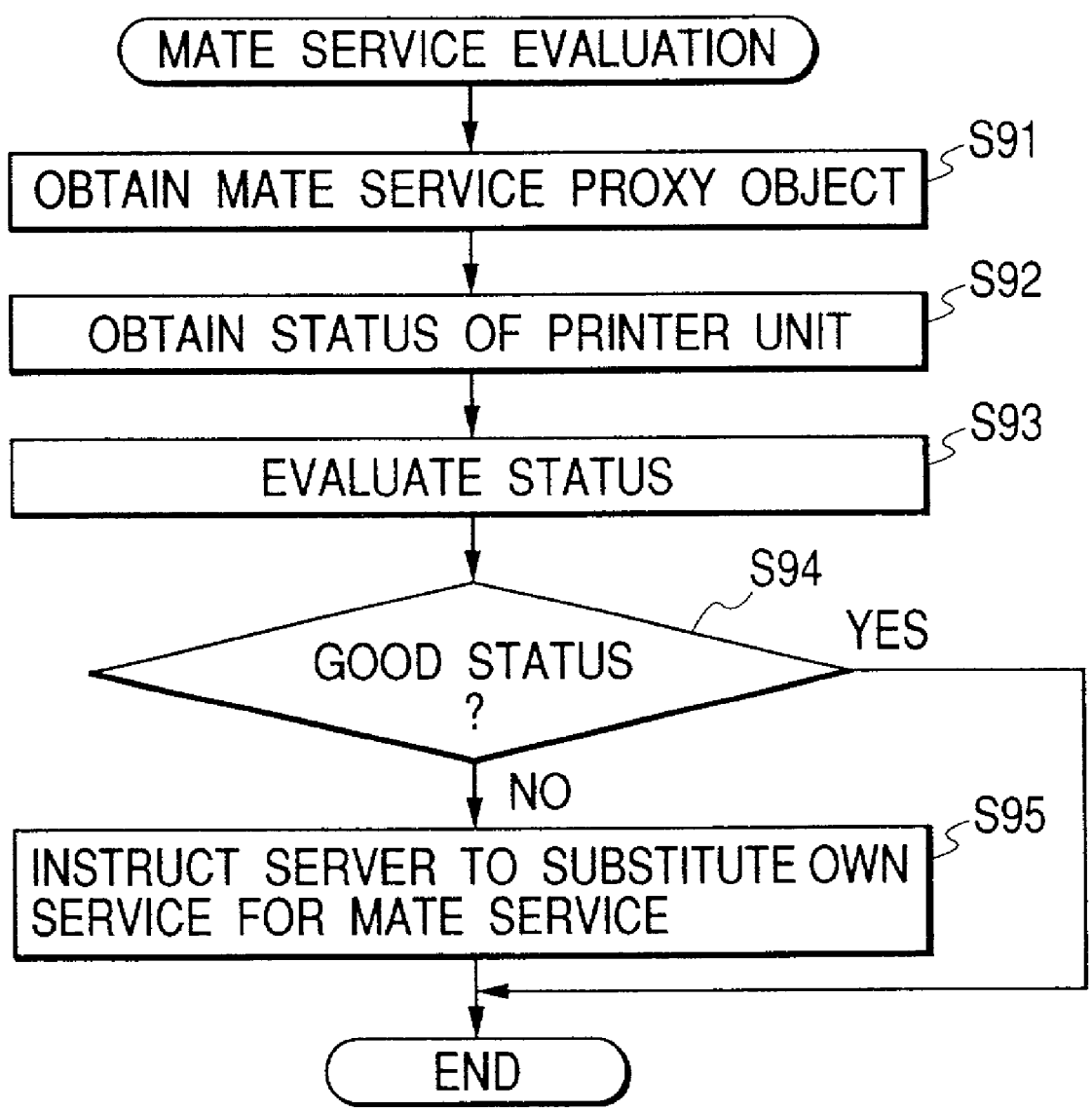
FIG. 22 is a flow chart showing the sequence of a service evaluating process executed by an image input/output apparatus adapted to the dispersed object environment in a seventh embodiment of the present invention.

FIG. 22 is a flow chart showing the sequence of a service evaluating process in a seventh embodiment of the present invention, executed respectively by each of the CPUs 123 of the dispersed object environment-adapted image input/output apparatuses 12, on the service of the other of paired apparatuses. The CPU 123 evaluates the quality of the service of the other apparatus by periodically repeating the present service evaluating process by a timer process based on a timer (not shown).

For the purpose of simplicity, the present embodiment deals, among the services provided by the dispersed object environment-adapted image input/output apparatuses 12, with the printing service of providing the client with the printing function. The process of the present flow chart is executed, by a time-shared process of the CPU 123 of the dispersed object environment-adapted image input/output apparatus 12, in parallel with other processes required in the apparatus. The process of the present flow chart is executed as a pseudo-client in the dispersed object environment-adapted image input/output apparatus 12, utilizing the services of the other image input/output apparatus 12.

When the service evaluating process is started, in step S91 the service proxy object 713 of the other is obtained from the lookup server 14. The service proxy object 713 is downloaded in the same manner as in the process of the ordinary client.

Then in step S92 is called a state obtaining operation from the interface 715 of the service proxy object 713, thereby obtaining the dynamic state information of the printer. In step S93 is evaluated the state information obtained in the preceding step S92, based on a predetermined algorithm. Such algorithm can be defined by an evaluation function of a wide sense, providing a significant negative point for example for a case of exhaustion of the color toner or ink in a color printer, and a negative point for exhaustion of a large-sized printing sheet in a large-sized printer.

In the next step S94 a comparison is made of the result of evaluation (for example a negative point) in the above-mentioned step S93 with a predetermined reference value, thereby discriminating whether a predetermined evaluation is obtained. If such has been obtained, the present service evaluating process is terminated.

On the other hand, if the predetermined evaluation is not obtained, the sequence proceeds to step S95 in which is called a service transfer instructing operation of the lookup server 14 in order to introduce a service provided by the apparatus itself to the client, as a substitute for the service of the other apparatus, which is failing to provide the predetermined evaluation, and the present service evaluating process is thereafter terminated.

When the above-mentioned service transfer instructing operation is called, the lookup server 14 sets the identification information of the designated transfer service, as a substitute attribute in the record of the corresponding service in the management table 1801 shown in FIG. 12.

In the present seventh embodiment, as explained in the foregoing, each of the paired dispersed object environment-adapted image input/output apparatuses 12 mutually tries the services of the other and, in case of the detection of a loss in the practical quality of the service of the other by a dynamically changing state (in particular by the shortage of a consumable resource in the apparatus), the deletion of the registration of the abnormal service can be promptly notified to the lookup server 14. It is thus rendered possible to shorten the time of continued registration of an ineffective service in the lookup server 14 and to reduce the danger that the client may try to utilize an ineffective service.

OTHER EMBODIMENTS

The present invention may be applied to a system consisting of plural pieces of equipment (for example a host computer, an interface device, a reader, a printer, etc.) or to an apparatus consisting of a single unit of equipment (for example, a copying apparatus or a facsimile apparatus).

Also, the objects of the present invention can naturally be attained by supplying a system or an apparatus with a recording medium (memory medium) storing program codes of a software realizing the functions of the aforementioned embodiments and reading and executing the program codes stored in the recording medium by a computer (or a CPU or an MPU) of the system or the apparatus.

In such case, the program codes themselves read from the recording medium realize the functions of the aforementioned embodiments, and the recording medium storing the program codes constitutes the present invention.

The recording medium storing the program codes and also variable data such as a table can be, for example, a floppy disk (FD), a hard disk, an optical disk, a magnetooptical disk, a CD-ROM, a CD-R, a magnetic tape, a non-volatile memory card (IC memory card) or a ROM.

The present invention includes not only a case where the functions of the aforementioned embodiments are realized by the execution of the program codes read by the computer but also a case where an operating system or the like functioning on the computer performs all or a part of the actual process according to the instructions of such program codes whereby the functions of the aforementioned embodiments are realized by such process.

In the directory server of the network system based on the dispersed objects, as explained in the foregoing, the present invention allows to transmit, to the client, not only the information provided from the registered service but also the information indicating the level of recommendation for the service, obtained by the directory server itself by trying and evaluating the registered service, thereby providing a directory server enabling the client easily to select the optimum service.

Also, in the network system based on the dispersed objects, the present invention relies not only on the information provided from the registered service but also causes the grouped apparatuses continue to mutually try and evaluate the services, thereby allowing one automatically to eliminate, from the directory server, the registration of the service which becomes ineffective relatively early without notification.

Furthermore, in the system including a plurality of equivalent services, the present invention allows the client automatically to select a service substituting a failed service in a manner equivalent to the client, thereby providing the apparatus adapted to the dispersed object environment, capable of enjoying the benefit of the usability improved by the redundant configuration, without complicating the processing required of the client.

Furthermore, the present invention provides the apparatus adapted to the dispersed object environment capable of realizing simple load dispersion (load balancing) based on the redundant configuration.

Furthermore, the present invention enables switching to the substitute service based on the dynamic state change in the apparatus such as exhaustion of toner or recording sheets, thereby providing the apparatus adapted to the dispersed object environment, realizing the redundant configuration capable of coping with a deterioration in the practical quality of the provided services.

What is claimed is:

1. A service management apparatus in a network system, for managing service information of a service provided by a service apparatus and transferring the managed service information to an external apparatus in response to a request from the external apparatus, said service management apparatus comprising:
   test means for executing a process of a trial use of the service provided by the service apparatus, wherein, in the trial use, said test means sends data to the service by using an operation of the service;
   evaluation means for evaluating the quality of the service, based on a result of the trial use of the service executed by said test means; and
   renewal means for renewing the managed service information based on the quality evaluated by said evaluation means.

2. A service management apparatus according to claim 1, wherein said evaluation means evaluates the result of the trial use of the service executed by said test means by a predetermined evaluation function.

3. A service management apparatus according to claim 2, wherein said renewal means deletes the managed service information in a case the evaluation by the predetermined evaluation function does not meet a predetermined reference.

4. A service management apparatus according to claim 2, wherein the predetermined evaluation function evaluates the quality of the service based on the time required for calling the service.

5. A service management apparatus according to claim 2, wherein the predetermined evaluation function evaluates the quality of the service based on an error frequency generated by a service calling.

6. A service management apparatus according to claim 1, wherein:
   said test means executes an access process for writing data to a storage service and reading data from the storage service on a trial basis; and
   said evaluation means evaluates the quality of the storage service based on the result of the access process performed by said test means.

7. A service management apparatus according to claim 1, wherein said evaluation means detects the number of colors or recording sheets available in an imaging service and evaluates the quality of the service based on the number of colors or recording sheets available in the service.

8. A service management apparatus according to claim 1, wherein the service apparatus comprises a printer.

9. An apparatus connected to a service management apparatus for managing service information of a service on a network system and transferring the managed service information to an external apparatus in response to a request from the external apparatus, said apparatus comprising:
   test means for executing a process of a trial use of a service of another apparatus belonging to a same group as that of said apparatus, wherein, in the trial use, the service of the other apparatus is executed;
   evaluation means for evaluating the quality of the service, based on a result of the trial use of the service executed by said test means; and
   deletion means for instructing, in a case in which the quality evaluated by said evaluation means does not meet a predetermined reference, the service management apparatus to delete the service information related to said apparatus and to the other apparatus from the service management apparatus.

10. A service management method in a network system, for managing service information of a service provided by an apparatus and transferring the managed service information to an external apparatus in response to a request from the external apparatus, said service management method comprising:
    a test step of executing a process of a trial use of the service provided by the apparatus, wherein, in the trial use, said test means sends data to the service by using an operation of the service;
    an evaluation step of evaluating the quality of the service, based on a result of the trial use of the service executed in said test step; and
    a renewal step of renewing the managed service information based on the quality evaluated in said evaluation step.

11. A service management method according to claim 10, wherein said evaluation step includes evaluating the result of the trial use of the service executed in said test step by a predetermined evaluation function.

12. A service management method according to claim 11, wherein said renewal step includes deleting the managed service information in a case the evaluation by the predetermined evaluation function does not meet a predetermined reference.

13. A service management method according to claim 11, wherein the predetermined evaluation function evaluates the quality of the service based on the time required for calling the service.

14. A service management method according to claim 11, wherein the predetermined evaluation function evaluates the quality of the service based on an error frequency generated by a service calling.

15. A service management method according to claim 10, wherein:
said test step includes executing an access process for writing data to a storage service and reading data from the storage service on a trial basis; and
said evaluation step includes evaluating the quality of the storage service based on the result of the access process performed in said test step.

16. A service management method according to claim 10, wherein said evaluation step includes detecting the number of colors or recording sheets available in an imaging service and evaluates the quality of the imaging service based on the number of colors or recording sheets available in the imaging service.

17. A service management method according to claim 10, wherein the plurality of apparatuses includes a printer.

18. A method for use in an apparatus connected to a service management apparatus for managing service information of a service on a network system and transferring the managed service information to an external apparatus in response to a request from the external apparatus, said method comprising:
a test step of executing a process of a trial use of a service of another apparatus belonging to a same group as that of the apparatus, wherein in the trial use, the service of the other apparatus is executed;
an evaluation step of evaluating the quality of the service, based on a result of the trial use of the service executed in said test step; and
a deletion step of instructing, in a case in which the quality evaluated in said evaluation step does not meet a predetermined reference, the service management apparatus to delete the service information related to the apparatus and to the other apparatus from the service management apparatus.

19. A computer readable storage medium storing a program for executing a service management method in a network system, for managing service information of a service provided by an apparatus and transferring the managed service information to an external apparatus in response to a request from the external apparatus, said program comprising:
code for a test step of executing a process of a trial use of the service provided by the apparatus, wherein, in the trial use, data are sent to the service by using an operation of the service;
code for an evaluation step of evaluating the quality of the service, based on a result of the trial use of the service executed by said code for a test step; and
code for a renewal step of renewing the managed service information based on the quality evaluated by execution of said code for an evaluation step.

20. A computer readable storage medium storing a program executing a method for use in an apparatus connected to a service management apparatus for managing service information of a service on a network system and transferring the managed service information to an external apparatus in response to a request from the external apparatus, said program comprising:
code for a test step of executing a process of a trial use of a service of another apparatus belonging to a same group as that of the apparatus, wherein, in the trial use, the service of the other apparatus is executed;
code for an evaluation step of evaluating the quality of the service, based on a result of the trial use of the service executed by said code for a test step; and
code for a deletion step of instructing, in a case in which the quality evaluated by execution of said code for an evaluation step does not meet a predetermined reference, the service management apparatus to delete the service information related to the apparatus and to the other apparatus from the service management apparatus.

21. A service management apparatus according to claim 1, wherein said test means, in the trial use, sends a service request to the one service and receives a response from the one service after the service executes a predetermined process in the one apparatus.

22. A service management apparatus according to claim 9, wherein said test means, in the trial use, sends a service request to the one service and receives a response from the one service after the service executes a predetermined process in the one apparatus.

23. A service management method according to claim 10, wherein said test step includes, in the trial use, sending a service request to the one service and receiving a response from the one service after the service executes a predetermined process in the one apparatus.

24. A service management method according to claim 18, wherein said test step includes, in the trial use, sending a service request to the one service and receiving a response from the one service after the service executes a predetermined process in the one apparatus.

* * * * *

UNITED STATES PATENT AND TRADEMARK OFFICE
CERTIFICATE OF CORRECTION

| | |
|---|---|
| PATENT NO. | : 7,167,909 B2 |
| APPLICATION NO. | : 09/823990 |
| DATED | : January 23, 2007 |
| INVENTOR(S) | : Masahito Yamamoto |

It is certified that error appears in the above-identified patent and that said Letters Patent is hereby corrected as shown below:

SHEET 10:

Fig. 12, "DAVICE" (all occurrences) should read --DEVICE--.

COLUMN 2:

Line 44, "is" should read --are--.

COLUMN 11:

Line 25, "realizes" should read --realized--.

COLUMN 23:

Lines 48-63, Claim 1 should read:

--1. A service management apparatus in a network system, for managing service information of a service provided by a service apparatus and transferring the managed service information to an external apparatus in response to a request from the external apparatus, said service management apparatus comprising:
    storage means for storing service information of services executed in the network system;
    registration means for registering, in said storage means, service information of a certain service provided by the service apparatus by means of an application program, in response to a request from an external apparatus that is to execute the service;
    test means for executing a trial use of the service provided by the service apparatus, wherein, in the trial use, said test means sends data to the service by using an operation of the service provided by the application program, said test means repeatedly executing the trial use;
    evaluation means for evaluating the quality of the service, in response to execution of the trial use by said test means, and detecting a change in quality of the service between a current trial use and a previous trial use; and
    renewal means for deleting the service information registered by said registration means from said storage means if the change detected by said evaluation means shows that the quality of the service does not meet a predetermined reference.--

UNITED STATES PATENT AND TRADEMARK OFFICE
CERTIFICATE OF CORRECTION

| | |
|---|---|
| PATENT NO. | : 7,167,909 B2 |
| APPLICATION NO. | : 09/823990 |
| DATED | : January 23, 2007 |
| INVENTOR(S) | : Masahito Yamamoto |

It is certified that error appears in the above-identified patent and that said Letters Patent is hereby corrected as shown below:

COLUMN 24:

Line 3, "case" should read --case where--;
    Lines 29-46, Claim 9 should read:

--9. An apparatus connected to a service management apparatus for managing service information of a service on a network system and transferring the managed service information to an external apparatus in response to a request from the external apparatus, said apparatus comprising:

storage means for storing service information of services executed in the network system;

registration means for registering, in said storage means, service information of a certain service provided by an application program in a service apparatus, in response to a request from an external apparatus that is to execute the service;

test means for executing a trial use of a service provided by means of the application program in another apparatus belonging to a same group as that of said apparatus, wherein, in the trial use, the service of the other apparatus is executed, said test means repeatedly executing the trial use;

evaluation means for evaluating the quality of the service in response to execution of the trial use by said test means, and detecting change in quality of the service between a current trial use and a previous trial use; and deletion means for instructing the service management apparatus to delete the service information related to said apparatus if the change detected by said evaluation means shows that the quality of the service does not meet a predetermined reference.--; and

UNITED STATES PATENT AND TRADEMARK OFFICE
CERTIFICATE OF CORRECTION

| | |
|---|---|
| PATENT NO. | : 7,167,909 B2 |
| APPLICATION NO. | : 09/823990 |
| DATED | : January 23, 2007 |
| INVENTOR(S) | : Masahito Yamamoto |

It is certified that error appears in the above-identified patent and that said Letters Patent is hereby corrected as shown below:

COLUMN 24 (con't)

Lines 47-63, Claim 10 should read:

--10. A service management method in a network system, for managing service information of a service provided by an apparatus and transferring the managed service information to an external apparatus in response to a request from the external apparatus, said service management method comprising:
 a storage step of storing, in storage, service information of services executed in the network system;
 a registration step of for registering, in the storage, service information of a certain service provided by the service apparatus by an application program, in response to a request from an external apparatus that is to execute the service;
 a test step of executing a trial use of the service provided by the apparatus, wherein, in the trial use, said test step includes sending data to the service by using an operation of the service provided by means of the application program, said test step also including repeatedly executing the trial use;
 an evaluation step of evaluating the quality of the service, in response to execution of the trial use in said test step, and detecting a change in quality of the service between a current trial use and a previous trial use; and
 a renewal step of deleting the service information registered in said registration step from the storage if the change detected in said evaluation step shows that the quality of the service does not meet a predetermined reference.--.

UNITED STATES PATENT AND TRADEMARK OFFICE
CERTIFICATE OF CORRECTION

| | | |
|---|---|---|
| PATENT NO. | : 7,167,909 B2 | |
| APPLICATION NO. | : 09/823990 | |
| DATED | : January 23, 2007 | |
| INVENTOR(S) | : Masahito Yamamoto | |

It is certified that error appears in the above-identified patent and that said Letters Patent is hereby corrected as shown below:

COLUMN 25:

Line 3, "case" should read --case where--; and
Lines 30-48, Claim 18 should read:

--18. A method for use in an apparatus connected to a service management apparatus for managing service information of a service on a network system and transferring the managed service information to an external apparatus in response to a request from the external apparatus, said method comprising:
    a storage step of storing, in storage, service information of services executed in the network system;
    a registration step of registering, in the storage, service information of a certain service provided by an application program in a service apparatus, in response to a request from an external apparatus that is to execute the service;
    a test step of executing a trial use of a service provided by means of the application program in another apparatus belonging to a same group as that of the apparatus, wherein in the trial use, the service of the other apparatus is executed, said test step including repeatedly executing the trial use;
    an evaluation step of evaluating the quality of the service in response to execution of the trial use in said test step, and detecting change in quality of the service between a current trial use and a previous trial use; and
    a deletion step of instructing the service management apparatus to delete the service information related to the apparatus if the change detected in said evaluation step shows that the quality of the service does not meet a predetermined reference.--.

UNITED STATES PATENT AND TRADEMARK OFFICE
CERTIFICATE OF CORRECTION

| | | |
|---|---|---|
| PATENT NO. | : 7,167,909 B2 | |
| APPLICATION NO. | : 09/823990 | |
| DATED | : January 23, 2007 | |
| INVENTOR(S) | : Masahito Yamamoto | |

It is certified that error appears in the above-identified patent and that said Letters Patent is hereby corrected as shown below:

COLUMNS 25-26:

Lines 49-55 and 1-10, Claim 19 should read:

--19. A computer readable storage medium storing a program for executing a service management method in a network system, for managing service information of a service provided by an apparatus and transferring the managed service information to an external apparatus in response to a request from the external apparatus, said program comprising:

code for a storage step of storing, in storage, service information of services executed in the network system;

code for a registration step of registering, in the storage, service information of a certain service provided by the service apparatus by an application program, in response to a request from an external apparatus that is to execute the service;

code for a test step of executing a trial use of the service provided by the apparatus, wherein, in the trial use, data are sent to the service by using an operation of the service provided by means of the application program, the test step also including repeatedly executing the trial use;

code for an evaluation step of evaluating the quality of the service, in response to execution of the trial use by execution of said code for a test step, and detecting a change in quality of the service between a current trial use and a previous trial use; and code for a renewal step of deleting the service information registered by execution of said code for a registration step from the storage if the change detected by execution of said code for a evaluation step shows that the quality of the service does not meet a predetermined reference.--.

COLUMN 26:

Lines 11-32, Claim 20 should read:

--20. A computer readable storage medium storing a program executing a method for use in an apparatus connected to a service management apparatus for managing service information of a service on a network system and transferring the managed service information to an external apparatus in response to a request from the external apparatus, said program comprising:

code for a storage step of storing, in storage, service information of services executed in the network system;

UNITED STATES PATENT AND TRADEMARK OFFICE
CERTIFICATE OF CORRECTION

| | | |
|---|---|---|
| PATENT NO. | : 7,167,909 B2 | |
| APPLICATION NO. | : 09/823990 | |
| DATED | : January 23, 2007 | |
| INVENTOR(S) | : Masahito Yamamoto | |

It is certified that error appears in the above-identified patent and that said Letters Patent is hereby corrected as shown below:

<u>COLUMN 26</u>:

Lines 11-32, (con't)

code for a registration step of registering, in the storage, service information of a certain service provided by an application program in a service apparatus, in response to a request from an external apparatus that is to execute the service;
        code for a test step of executing a trial use of a service provided by the application program in another apparatus belonging to a same group as that of the apparatus, wherein, in the trial use, the service of the other apparatus is executed, the test step also including repeatedly executing the trial use;
        code for an evaluation step of evaluating the quality of the service in response to execution of the trial use by said code for a test step, and detecting change in quality of the service between a current trial use and a previous trial use; and
        code for a deletion step of instructing the service management apparatus to delete the service information related to the apparatus if the change detected by execution of said code for an evaluation step shows that the quality of the service does not meet a predetermined reference.--.

Signed and Sealed this

Third Day of June, 2008

JON W. DUDAS
*Director of the United States Patent and Trademark Office*